United States Patent
Nagashima et al.

(10) Patent No.: US 7,155,736 B2
(45) Date of Patent: Dec. 26, 2006

(54) IMAGE TRANSMISSION APPARATUS, IMAGE TRANSMISSION SYSTEM, AND COMMUNICATION APPARATUS

(75) Inventors: Takayuki Nagashima, Yokohama (JP); Toshiaki Suzuki, Kawaguchi (JP); Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 09/874,285

(22) Filed: Jun. 6, 2001

(65) Prior Publication Data

US 2001/0029608 A1 Oct. 11, 2001

Related U.S. Application Data

(62) Division of application No. 08/672,023, filed on Jun. 26, 1996, now Pat. No. 6,275,988.

(30) Foreign Application Priority Data

| Jun. 30, 1995 | (JP) | ................................... 7-166231 |
| Jul. 25, 1995 | (JP) | ................................... 7-189283 |
| Jul. 25, 1995 | (JP) | ................................... 7-189285 |

(51) Int. Cl.
H04N 7/16 (2006.01)
H04N 7/173 (2006.01)
(52) U.S. Cl. .......................... 725/116; 725/8
(58) Field of Classification Search ................ 725/8, 725/116, 87, 96
See application file for complete search history.

(56) References Cited

U.S. PATENT DOCUMENTS

| 4,755,872 A | 7/1988 | Bestler et al. ................. 358/86 |
| 4,807,023 A | 2/1989 | Bestler et al. ................. 358/86 |
| 5,115,429 A | 5/1992 | Hluchyj et al. ............... 370/84 |
| 5,148,272 A | 9/1992 | Acampora et al. ........... 358/133 |
| 5,151,782 A | 9/1992 | Ferraro ......................... 358/86 |
| 5,163,055 A | 11/1992 | Lee et al. ...................... 371/32 |
| 5,253,058 A | 10/1993 | Gharavi ........................ 358/136 |
| 5,341,373 A | 8/1994 | Ishibashi et al. ............ 370/85.9 |
| 5,367,330 A | 11/1994 | Haave et al. ................... 348/7 |
| 5,438,356 A | 8/1995 | Ushiki et al. ................. 348/12 |
| 5,521,717 A | 5/1996 | Maeda ......................... 358/426 |
| 5,629,866 A * | 5/1997 | Carrubba et al. ........... 348/563 |
| 5,689,800 A * | 11/1997 | Downs ......................... 725/114 |
| 5,699,476 A | 12/1997 | Van Der Meer ............ 386/111 |
| 5,699,526 A | 12/1997 | Siefert ......................... 395/227 |
| 5,721,829 A * | 2/1998 | Dunn et al. .................... 725/87 |
| 5,742,892 A * | 4/1998 | Chaddha ..................... 725/146 |
| 5,802,502 A * | 9/1998 | Gell et al. ..................... 705/37 |
| 5,909,238 A | 6/1999 | Nagashima et al. ........... 348/3 |

FOREIGN PATENT DOCUMENTS

| FR | 2420261 | 10/1979 |
| WO | WO 94/14281 | 6/1994 |

OTHER PUBLICATIONS

Derwent Abs. Acc. No. 95-21163/28, CI. W02W04, JP 7123392 (Canon KK) May 12, 1995.
Pat. Abs. Jp., E1552, p. 167 (JP 6-46175 A) (FUJITSU Ltd) Feb. 18, 1994.
Wood, D. "European perspectives on digital television broadcasting—Quality objectives and prospects for commonality", EBU Review Technical, No. 256, 1993, pp. 9-15.

* cited by examiner

*Primary Examiner*—John Miller
*Assistant Examiner*—Hunter Lonsberry
(74) *Attorney, Agent, or Firm*—Fitzpatrick, Cella, Harper & Scinto

(57) ABSTRACT

An image transmission apparatus for processing hierarchically encoded image information includes an accounting unit for performing accounting processing in correspondence with the resolution of the image information.

5 Claims, 26 Drawing Sheets

| TITLE OF INFORMATION | RESOLUTION | CHARGE |
|---|---|---|
| INFO 1 | 1<br>2<br>3<br>⋮ | CHARGE 11<br>CHARGE 12<br>CHARGE 13<br>⋮ |
| INFO 2 | 1<br>2<br>3<br>⋮ | CHARGE 21<br>CHARGE 22<br>CHARGE 23<br>⋮ |
| ⋮ | ⋮ | ⋮ |

DATA BASE

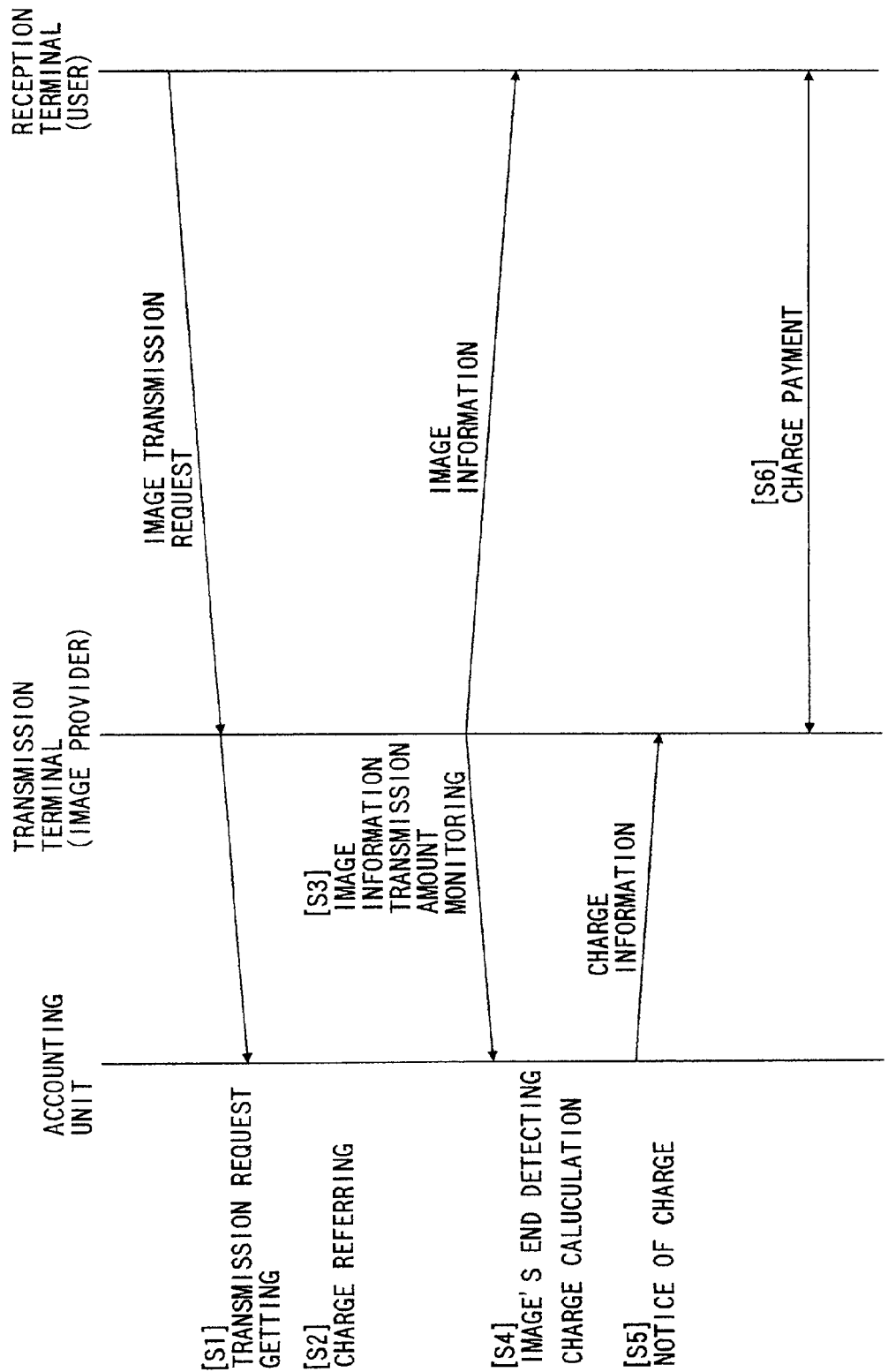

| TITLE OF INFORMATION | RESOLUTION | CHARGE | TRANSMISSION CAPACITY |
|---|---|---|---|
| INFO 1 | 1<br>2<br>3<br>⋮ | CHARGE 11<br>CHARGE 12<br>CHARGE 13<br>⋮ | C11<br>C12<br>C13<br>⋮ |
| INFO 2 | 1<br>2<br>3<br>⋮ | CHARGE 21<br>CHARGE 22<br>CHARGE 23<br>⋮ | C21<br>C22<br>C23<br>⋮ |
| ⋮ | ⋮ | ⋮ | ⋮ |

DATA BASE

IMAGE TRANSMISSION SYSTEM

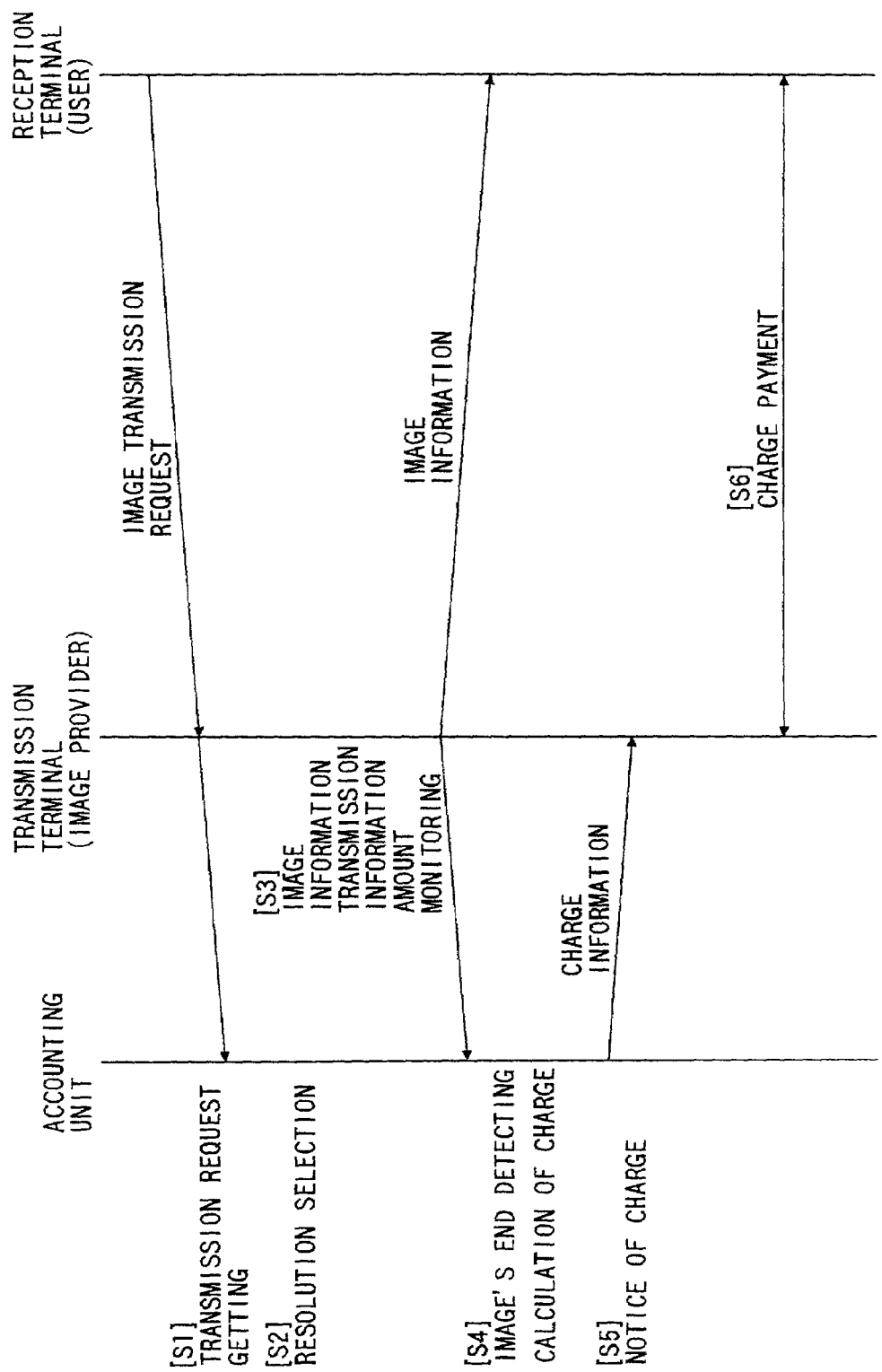

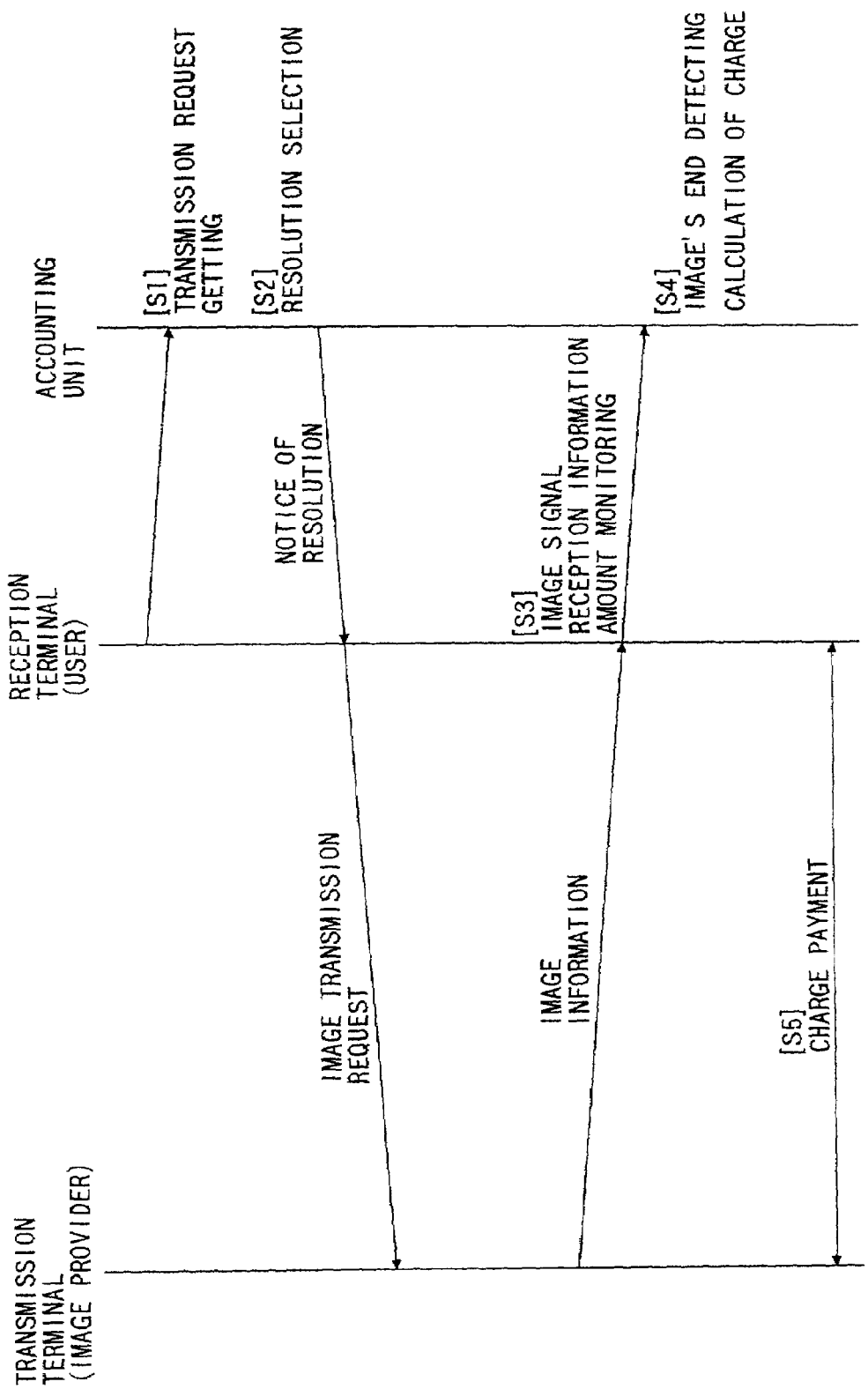

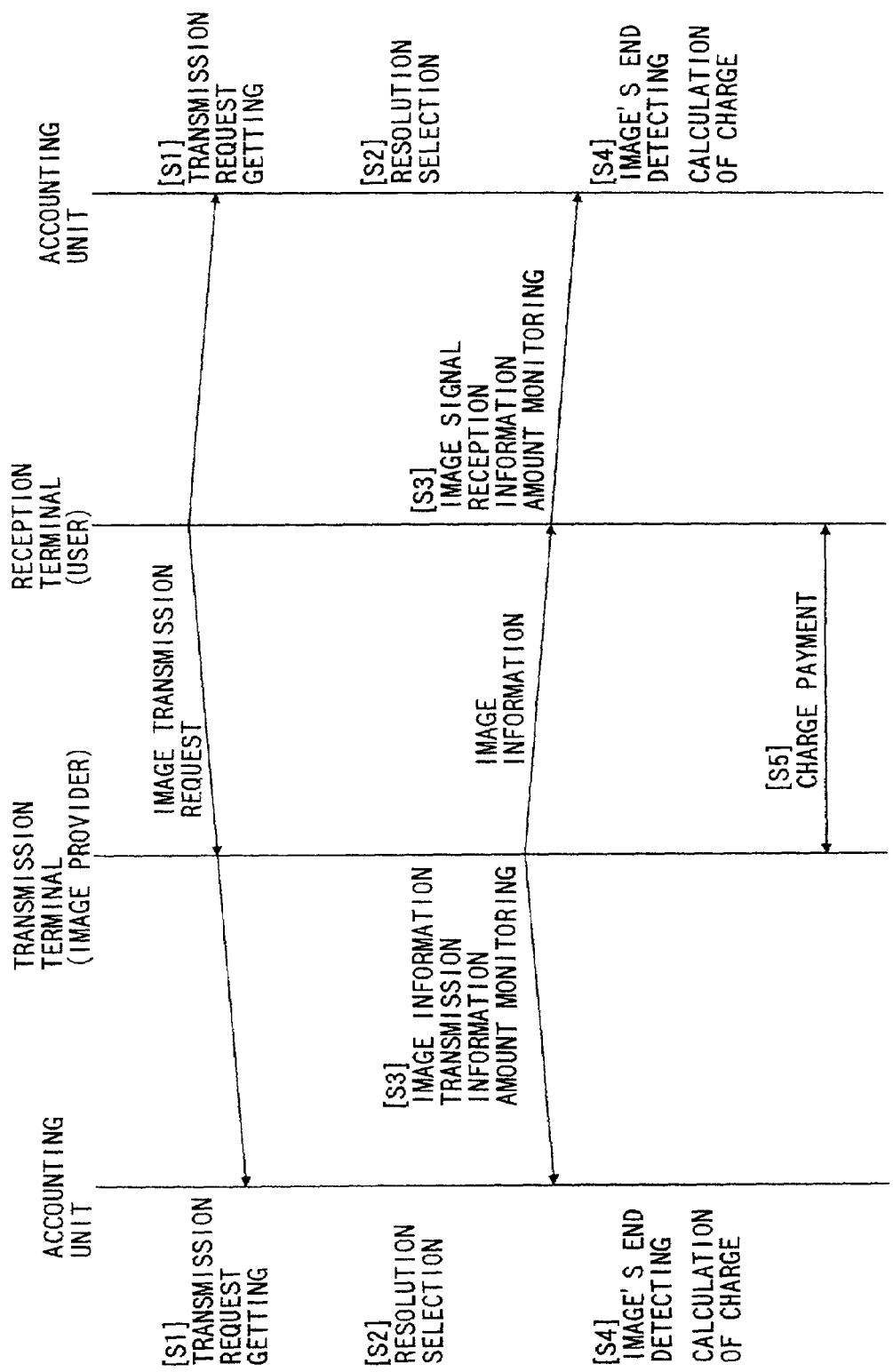

FIG. 32

ACCOUNTING DATA BASE — 101

| KIND OF INFORMATION | UNIT CHARGE |
|---|---|
| NUMBER OF PIXELS 1 | UNIT CHARGE 1 |
| NUMBER OF PIXELS 2 | UNIT CHARGE 2 |
| NUMBER OF PIXELS 3 | UNIT CHARGE 3 |
| ⋮ | ⋮ |
| CHROMATICITY 1 | |
| CHROMATICITY 2 | |
| CHROMATICITY 3 | |
| ⋮ | ⋮ |
| SATURATION 1 | |
| SATURATION 2 | |

← READING OF UNIT CHARGE →

FIG. 33

ACCUMULATED AMOUNT STORAGE DEVICE — 102

| USER'S NAME | ACCUMULATER AMOUNT |
|---|---|
| A | AMOUNT 1 |
| B | AMOUNT 2 |
| C | AMOUNT 3 |
| ⋮ | ⋮ |

← READING AND WRITING OF ACCUMULATED AMOUNT →

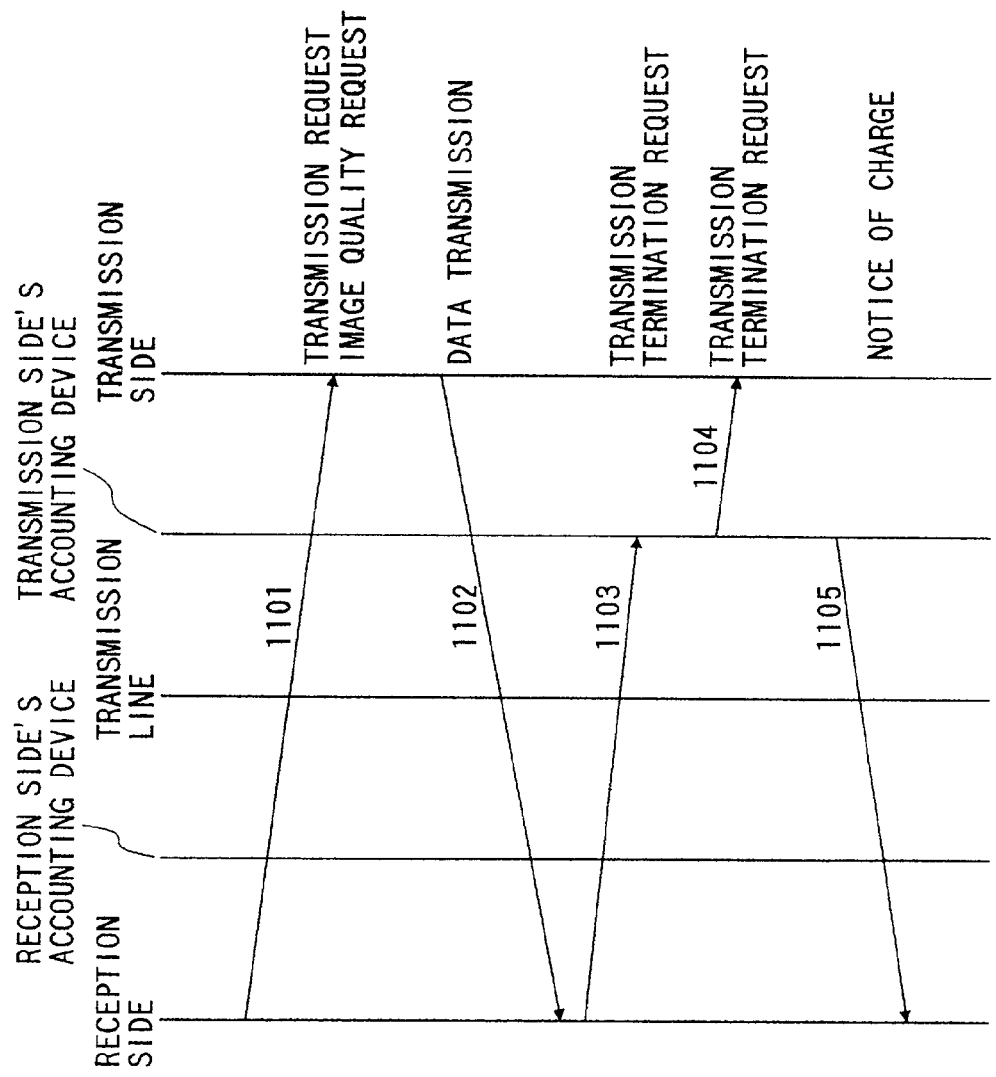

IMAGE TRANSMISSION APPARATUS, IMAGE TRANSMISSION SYSTEM, AND COMMUNICATION APPARATUS

This application is a division of application Ser. No. 08/672,023, filed on Jun. 26, 1996 now U.S. Pat. No. 6,275,988.

BACKGROUND OF THE INVENTION

1. Field of the Invention

The present invention relates to providing information in a multimedia network system for transmitting information such as dynamic image data, still image data, audio data, computer data, and the like, and an image transmission apparatus, an image transmission system, and a communication apparatus used therefor.

2. Related Background Art

In recent years, so-called information service industries are growing along with the use of optical fiber networks in trunk communication networks, spread of cable television systems, practical use of satellite communications, spread of local area networks, and the like.

The information service industries provide various kinds of information using the above-mentioned communication networks, and charge users in correspondence with the contents and volume of information. In such information service industries, it is important to appropriately charge or ask an account for the provided information.

However, the conventional information service industries use a month-to-month accounting system independently of the use frequency as in the cable television system or the satellite broadcast system, or an accounting system for counting only the use frequency (or use time) independently of the kind or quality of information.

SUMMARY OF THE INVENTION

The present invention has been made in consideration of the above-mentioned problems, and has as its first object to perform accounting processing in consideration of the kind and quality of information provided.

It is the second object of the present invention to prevent an illicit act against information transmitted/received in an image transmission system.

According to an embodiment of the present invention, an image transmission apparatus which processes hierarchically encoded image information, comprises accounting means for performing accounting processing in correspondence with a resolution of the image information.

According to another embodiment of the present invention, an image transmission apparatus which processes hierarchically encoded image information, comprises accounting means for performing accounting processing in correspondence with a resolution of the image information, and charge storage means for storing a charge of the image information calculated by the accounting means.

According to still another embodiment, an image transmission apparatus which processes hierarchically encoded image information, comprises accounting means for performing accounting processing in correspondence with a resolution and a volume of the image information.

According to still another embodiment, an image transmission apparatus which processes hierarchically encoded image information, comprises accounting means for performing accounting processing in correspondence with a resolution of the image information, information volume measuring means for measuring a volume of the image information, and charge storage means for storing a charge of the image information calculated by the accounting means.

According to still another embodiment, the apparatus comprises payment means for paying a charge of the image information at predetermined time intervals.

According to still another embodiment, an image transmission apparatus which processes hierarchically encoded image information, comprises accounting means for performing accounting processing in correspondence with a resolution of the image information, charge storage means for storing a charge of the image information calculated by the accounting means, and payment means for paying the charge of the image information at predetermined time intervals.

According to still another embodiment, the accounting means is arranged at the transmitter side.

According to still another embodiment, the accounting means is arranged at the receiver side.

According to still another embodiment, the accounting means are arranged at both the transmitter and receiver sides.

According to still another embodiment, an apparatus comprises image destination designation means for designating an arbitrary image reception apparatus as a destination of an image and requesting an image provider to transmit the image, image transmission means for transmitting the image to the image reception apparatus designated by the image destination designation means, and accounting means for performing accounting processing for a user who designated the destination of the image or a user who received the image.

According to still another embodiment, the apparatus comprises cipher means for performing at least one of encipherment or digital signature of the information to be transmitted.

According to an embodiment of the present invention, an image transmission system which processes hierarchically encoded image information, comprises a transmission apparatus, which comprises accounting means for performing accounting processing in correspondence with a resolution and a volume of the image information, information volume measuring means for measuring the volume of the image information, and charge storage means for storing the charge of the image information calculated by the accounting means, and a reception apparatus, which comprises payment means for paying the charge of the image information at predetermined time intervals.

According to another embodiment, a communication apparatus which receives data via a network, comprises detection means for detecting a traffic state of the network, and designation means for designating a transmission format of the data in correspondence with the detection result of the detection means.

According to still another embodiment, the designation means designates the transmission format to a transmission terminal via the network.

According to still another embodiment, the transmission format is a layer in hierarchical encoding.

Since the above-mentioned embodiment has the above technical means, charges of images can be calculated in units of resolutions.

According to another embodiment, since the accounting processing is performed in correspondence with the resolution and volume of the image information, charges of images can be calculated in units of resolutions, and can also be determined in consideration of the information volume.

According to still another embodiment, since the payment means for paying a charge at the predetermined time intervals is arranged, accounts can be settled at the predetermined time intervals by calculating an accumulated charge.

According to still another embodiment, the accounting processing can be performed in correspondence with the hierarchical encoding technique.

It is the third object of the present invention to perform accounting processing in correspondence with the traffic of a transmission line, and to prevent an illicit act against information transmitted/received in an image transmission system.

According to an embodiment of the present invention, an image transmission system for transmitting hierarchically encoded image information, comprises selection means for selecting a layer of an image to be transmitted in correspondence with a traffic of a transmission line for transmitting the hierarchically encoded image information, and accounting processing means for performing accounting processing of the image information to be transmitted in correspondence with the layer selected by the selection means.

According to another embodiment, an image transmission system which transmits image information, which is hierarchically encoded to have different resolutions in units of layers, between a transmission terminal and a reception terminal, comprises a reception terminal, which comprises traffic checking means for checking a traffic of a transmission line for transmitting the hierarchically encoded image information, and resolution selection means for selecting a resolution of an image to be transmitted in correspondence with the checking result of the traffic checking means, and a transmission terminal which comprises accounting processing means for performing accounting processing of the image information to be transmitted in correspondence with the resolution selected by the resolution selection means, and charge storage means for storing a charge of the image information.

According to still another embodiment, an image transmission system which processes hierarchically encoded image information, comprises traffic checking means for checking a traffic of a transmission line for transmitting the hierarchically encoded image information, resolution selection means for selecting a resolution of an image to be transmitted in correspondence with the checking result of the traffic checking means, accounting processing means for performing accounting processing of the image information to be transmitted in correspondence with the resolution selected by the resolution selection means, and charge storage means for storing a charge of the image information.

According to still another embodiment, an image transmission system which processes hierarchically encoded image information, comprises traffic checking means for checking a traffic of a transmission line for transmitting the hierarchically encoded image information, resolution selection means for selecting a resolution of an image to be transmitted in correspondence with the checking result of the traffic checking means, information volume measuring means for measuring an information volume of the transmitted image, accounting processing means for performing accounting processing in correspondence with the resolution selected by the resolution and the information volume of the image information to be transmitted, and charge storage means for storing a charge of the image information.

According to the above embodiment, the resolution of an image to be transmitted is set in correspondence with the traffic of the transmission line, and the charge of the image can be calculated in correspondence with the set resolution.

Furthermore, paying attention to the facts that image information includes various image qualities, appropriate accounting processing cannot be attained by a single accounting system, and a technique for changing the accounting system in correspondence with the quality of an image is indispensable, the present invention has as its object to provide such technique. That is, reception apparatuses may reproduce images of different qualities, and information beyond the reproduction performance of the reproduction apparatus may not be delivered to an intended user. Also, a user may not want excessive information. In such cases, an accounting system corresponding to a desired quality of an image to be transmitted is required. Note that the quality of an image means the number of frames per unit time, the number of pixels of an image, and the number of resolving powers of a dynamic range such as chromaticity, saturation, and lightness levels of pixels included in an image.

It is, therefore, an object of the present invention to provide a communication apparatus and a communication system, which can perform accounting processing in correspondence with the quality of an image to be provided to a user.

According to an embodiment of the present invention, an apparatus comprises transmission means for transmitting information including an image, and accounting means for charging a receiver of the information an amount for the quality of the image.

According to another embodiment of the present invention, a communication system which communicates image information via a network, comprises a receiver of the image information, which comprises designation means for designating an image quality of image information to be received, and a transmitter, which comprises accounting means for transmitting image information corresponding to the image quality designated by the receiver side, and performing accounting processing in correspondence with the designated image quality.

According to the above embodiment, a user is charged an amount for the quality of an image to be provided to him or her.

Also, the user can select the quality of an image to be received by himself or herself.

In addition, information for selecting an image to be transmitted and its quality is ciphered, and is deciphered at the receiver side so as to prevent a user from disguising himself or herself as another user or information from being altered, thus guaranteeing security of information associated with accounting.

Furthermore, by measuring the processing time required for ciphering and deciphering, the accounting processing can be performed in correspondence with the time required for reception.

Other objects and features of the present invention will become apparent from the following specification and the accompanying drawings.

BRIEF DESCRIPTION OF THE DRAWINGS

FIG. 9 is a chart showing the operation sequence of the image transmission system of the fourth embodiment;

FIG. 26 is a chart for explaining the operation of the image transmission system of the fourth embodiment;

FIG. 28 is a chart for explaining the operation of the image transmission system of the fifth embodiment;

FIG. 30 is a chart for explaining the operation of the image transmission system of the sixth embodiment;

FIG. 32 is a view showing the format of an accounting data base shown in FIG. 31;

FIG. 33 is a view showing the storage format of an accumulated amount storage device shown in FIG. 31;

FIG. 36 is a sequence chart showing the operation of the system.

DETAILED DESCRIPTION OF THE PREFERRED EMBODIMENTS

Figure 1:
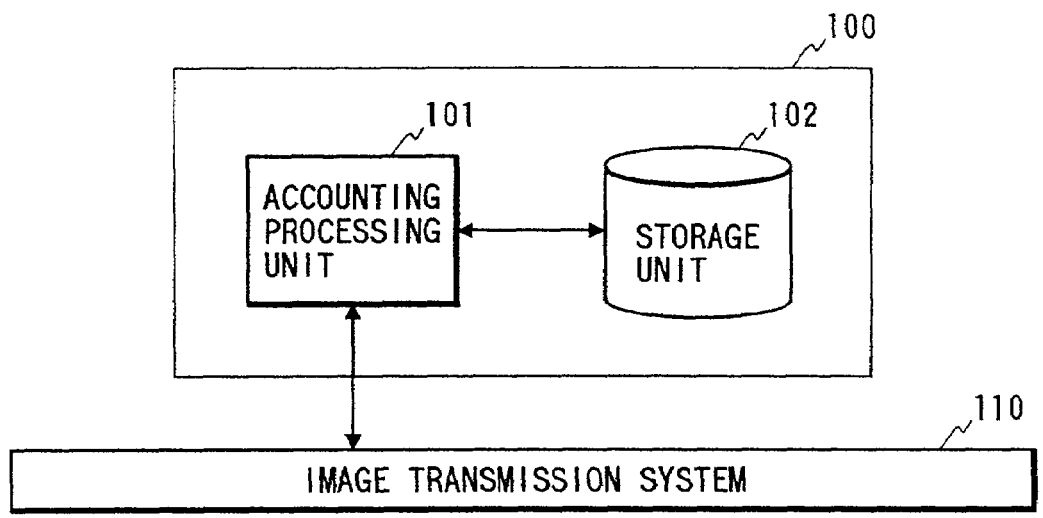
FIG. 1 is a functional block diagram showing an accounting unit according to the first embodiment of the present invention.

The preferred embodiments of an image transmission system according to the present invention will be described below with reference to the accompanying drawings.

In the embodiments to be described hereinafter, the present invention is applied to an accounting unit which can charge a user for an image in correspondence with the resolution (layer) to cope with hierarchical encoding in an image transmission system that transmits hierarchically encoded image information via a transmission line.

In particular, the first embodiment will explain an accounting unit used in a charge system that sets uniform charges in units of layers (resolutions) of information.

The second embodiment will explain an accounting unit used in a charge system that takes into consideration the information volume as well as the layers (resolutions) of information.

The third embodiment will explain an accounting unit used when accounts are settled at predetermined time intervals in the first and second embodiments.

The fourth embodiment will explain a case wherein the image provider side has one of the accounting units described in the first to third embodiments.

The fifth embodiment will explain a case wherein the image receiver side has one of the accounting units described in the first to third embodiments.

The sixth embodiment will explain a case wherein both the image provider and receiver sides have corresponding ones of the accounting units described in the first to third embodiments.

The seventh embodiment will explain a case wherein the accounting units described in the first to sixth embodiments are applied to communications between equipments connected to a local area network.

The eighth embodiment will explain a case wherein the accounting units described in the first to sixth embodiments are applied to communications between equipments connected to a wide area network.

The ninth embodiment will explain a case wherein a cipher unit is combined with one of the accounting units described in the fourth to eighth embodiments so as to protect information from being tapped or altered, and to perform fair accounting processing.

The first embodiment of an image transmission system according to the present invention will be described below with reference to the accompanying drawings.

In this embodiment, the present invention is applied to realize an accounting unit used in a charge system that sets charges in correspondence with the respective resolutions (layers) in units of images to cope with hierarchical encoding in an image transmission system for transmitting hierarchically encoded image information via a transmission line.

First, hierarchical encoding will be briefly described below. Hierarchical encoding is known as an encoding method which can efficiently cope with image processing apparatuses with different resolutions upon encoding image information, and is suitable for retrieving desired images from an image data base.

In the following description, a reduced image that roughly represents the overall image is encoded, and subsequently, difference information used for enlarging the reduced image in turn is encoded.

As a result, scalable encoding using different resolutions can be realized to some extent. For example, a reduced image with a small number of pixels may be displayed on a monitor, and a detailed image with a large number of pixels using full information may be printed.

Figure 18:
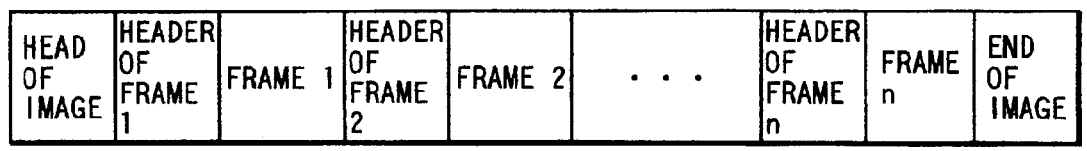
FIG. 18 shows the general format of hierarchically encoded data.

FIG. 18 shows the general format of hierarchically encoded data. Referring to FIG. 18, a field "head of image" includes a header indicating the beginning of a piece of image information as a whole. A field "header of frame 1" includes a bit pattern indicating the beginning of frame 1, and a field "frame 1" includes information of layer 1 obtained by encoding an image obtained by reducing an original image to the smallest size.

A field "header of frame 2" includes a bit pattern indicating the beginning of frame 2, and a field "frame 2" includes information of layer 2 as difference information that enlarges an image of layer 1 or increases its resolution.

Similarly, a field "header of frame n" includes a bit pattern indicating the beginning of frame n, and a field "frame n" includes information of layer n as difference information that enlarges an image of layer n-1 or increases its resolution.

As a typical encoding method, a JPEG hierarchical encoding method is used. As for the JPEG, please refer to ISO/IEC 10918-1, 10918 or ITU-T T.81, T.83. Such encoding techniques are popularly used in a multimedia network.

FIG. 1 is a functional block diagram showing the arrangement of an accounting unit of this embodiment. Referring to FIG. 1, an image transmission system 110 of this embodiment comprises an accounting unit 100, which includes an accounting processing unit 101 which fetches an image transmission request of a user transmitted/received in the image transmission system, and acquires accounting information from a storage unit 102 or notifies the storage unit 102 of such information.

The storage unit 102 stores charge information and use information to be referred to by the accounting processing unit 101. The image transmission system 110 of this embodiment is constituted by a network, and terminals such as computers, receivers, printers, monitors, and the like, which are connected to the network via lines or by radio.

Figures 3, 4:
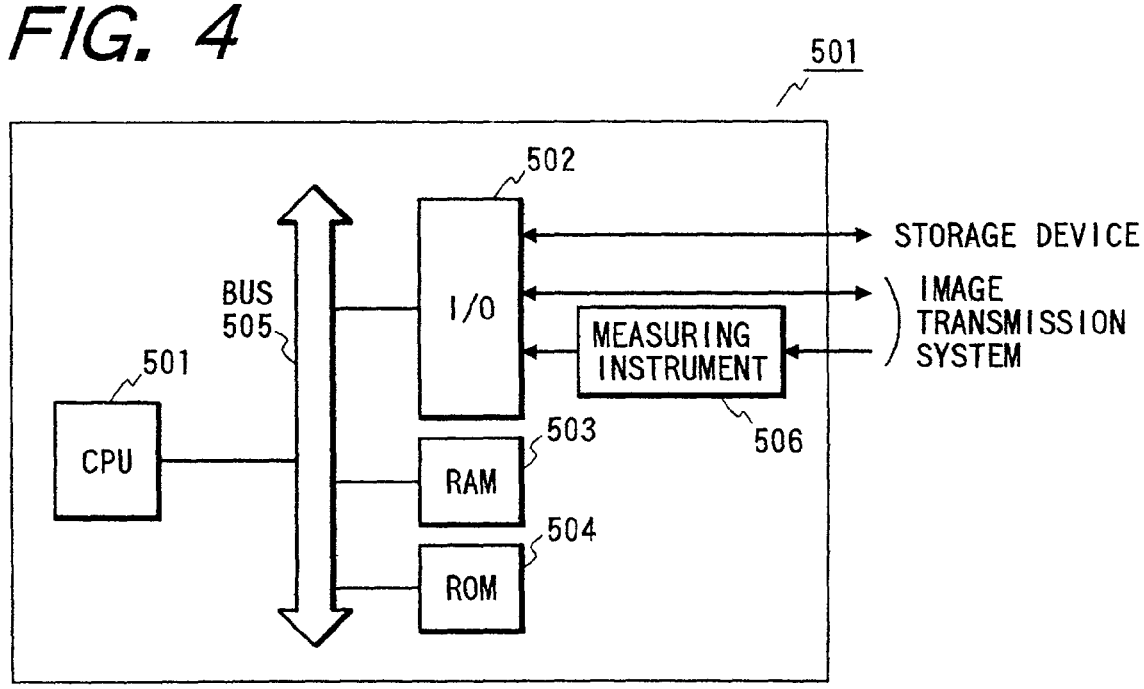
FIG. 3 shows a charge table used by the accounting unit of the first embodiment.
FIG. 4 is a block diagram showing the arrangement of an accounting processing unit in an accounting unit according to the second embodiment of the present invention.

FIG. 3 shows an example of a charge table stored in the storage unit 102. In the charge table shown in FIG. 3, for example, information Info 1 incurs charge 11 when it is provided at resolution 1, incurs charge 12 when it is provided at resolution 2, . . . .

An operation for performing accounting processing in a charge system that sets charges in units of resolutions by the accounting unit of this embodiment will be described below. In the following description, a case will be exemplified wherein a user (or a terminal used by the user) requests a provider to transmit image Info 1 at resolution 3.

In the first operation step, the accounting processing unit 101 fetches information that requests to transmit image Info 1 at resolution 3 by monitoring messages transmitted/received in the image transmission system or receiving a message from the image transmission system.

In the second operation step, the accounting processing unit 101 reads out charge 13 for providing image Info 1 at resolution 3 from the charge table (FIG. 3) stored in the storage unit 102.

In the third operation step, the accounting processing unit 101 outputs charge 13 to the image transmission system.

Figure 2:
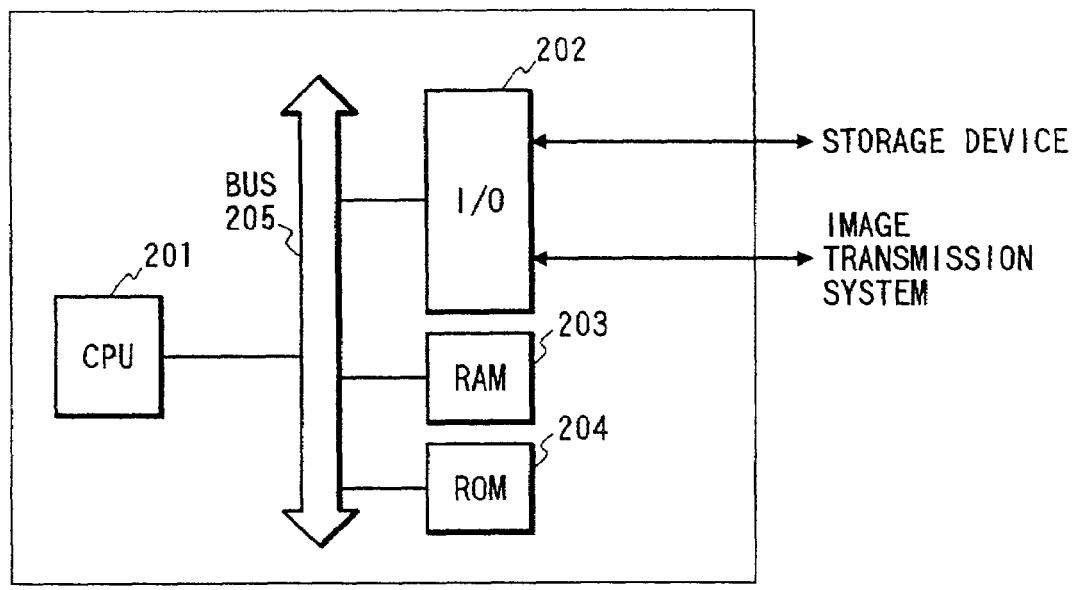
FIG. 2 is a block diagram showing the arrangement of an accounting processing unit in the accounting unit of the first embodiment.

FIG. 2 is a block diagram showing the arrangement of the accounting processing unit. Referring to FIG. 2, a CPU 201 processes input data from an I/O interface 202 and generates commands to an external apparatus in accordance with a program stored in a ROM 204 or a RAM 203.

The I/O interface 202 is used for exchanging information with the image transmission system and for inputting/outputting data to/from the storage unit. The RAM 203 is used as a temporary memory of the CPU 201, and stores a program.

The ROM 204 stores a program to be executed by the CPU 201. When a program is loaded from a device outside the accounting unit or the RAM 203 stores a program, the ROM 204 may be omitted.

The CPU 201 to the ROM 204 exchange data via a bus 205. Note that the storage unit 102 can be realized by using a storage device such as a magnetic storage device, an optical storage device, a semiconductor element, or the like.

The second embodiment of the present invention will be described below with reference to the accompanying drawings.

In this embodiment, the present invention is applied to realize an accounting unit for a charge system that sets charges per unit information volume in correspondence with the respective resolutions (layers) in units of images to cope with hierarchical encoding, and obtains the charge on the basis of the unit charge and the information volume of a transmitted image in an image transmission system for transmitting hierarchically encoded image information via a transmission line.

Note that the arrangement of the accounting processing unit of this embodiment is the same as that shown in FIG. 1.

An operation of the accounting unit of this embodiment for performing accounting processing in a charge system that sets charges per unit information volume (unit charges) in correspondence with the respective resolutions, and calculates the charge by multiplying the unit charge with the information volume of a transmitted image will be explained below. In the following description, a case will be exemplified wherein a user (a terminal used by the user) requests a provider to transmit image Info 1 at resolution 3.

In the first operation step, the accounting processing unit of this embodiment fetches information that requests to transmit image Info 1 at resolution 3 by monitoring messages transmitted/received in the image transmission system or receiving a message from the image transmission system.

In the second operation step, the accounting processing unit reads out unit charge 13 as a charge per unit information volume for providing image Info 1 at resolution 3 from the charge table (FIG. 3) stored in the storage unit.

In the third operation step, the accounting processing unit measures the information volume of image Info 1 which is being transmitted.

In the fourth operation step, upon completion of transmission of image Info 1, the accounting processing unit detects the end of image Info 1 which is being transmitted to User L by the same method as in the first operation step.

Subsequently, in the fifth operation step, the accounting processing unit calculates the charge on the basis of unit charge 13 and the measured information volume.

In the sixth operation step, the accounting processing unit notifies the image transmission system of the charge calculated in the fifth operation step. In this case, the operations in the fifth and sixth operation steps may be performed at an arbitrary timing during image transmission in place of the above-mentioned operations. Also, when an arrangement shown in FIG. 4 is to be adopted, a charge system other than the above system that calculates the charge by simply multiplying the unit charge with the information volume may be used.

FIG. 4 shows an example of the detailed arrangement of the accounting processing unit of this embodiment. A CPU 501 in FIG. 4 processes input data from an I/O interface 502 and generates commands to an external apparatus in accordance with a program stored in a ROM 504 or a RAM 503.

The I/O interface 502 is used for exchanging information with a communication partner in the image transmission system of this embodiment, and inputting/outputting data to/from the storage unit.

The RAM 503 is used as a temporary memory of the CPU 501, and stores a program.

The ROM 504 stores a program to be executed by the CPU 501. When a program is loaded from a device outside the accounting unit or the RAM 503 stores a program, the ROM 504 may be omitted.

The CPU 501 to the ROM 504 exchange data via a bus 505.

A measuring instrument 506 is used for measuring the volume of image information transmitted/received in the image transmission system, and comprises, e.g., a counter.

In the arrangement shown in FIG. 4, for example, a charge calculation or the like is performed by the CPU 501, and the operation step and the charge calculation method therefor are stored in the RAM 503 or the ROM 504. The fetching operation of the message into the accounting unit, charge notification, accesses to the storage unit, and the like are made via the I/O interface 502, and the volume of image information transmitted in the image transmission system is measured by the measuring instrument 506.

When the communication time is measured in place of the information volume, and the charge is calculated based on the unit charge and the measured time, the CPU 501 may perform measurements, and the measuring instrument 506 may be omitted.

Figure 5:
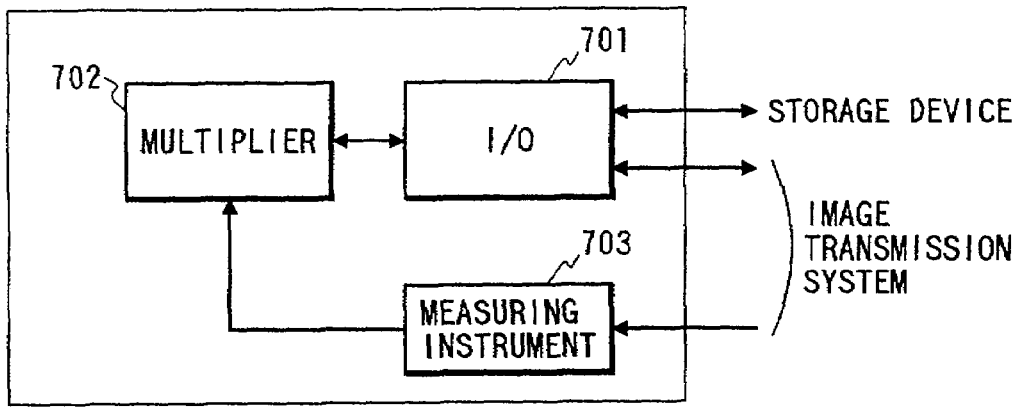
FIG. 5 is a block diagram showing another arrangement of the accounting processing unit in the accounting unit of the second embodiment.

The accounting processing unit of this embodiment may have an arrangement shown in FIG. 5. An I/O interface 701 shown in FIG. 5 fetches an image request signal transmitted/received in the image transmission system, reads out a unit charge from the charge table (FIG. 3) by accessing the storage unit, inputs the readout charge to a multiplier 702, and outputs the charge calculated by the multiplier 702 to the image transmission system.

The multiplier 702 calculates the product of the unit charge of an image input from the I/O interface 701 and the information volume measured by a measuring instrument 703, and outputs the value (product) as the charge to the I/O interface 701.

The measuring instrument 703 measures the volume of image information transmitted/received in the image transmission system, and comprises, e.g., a counter, timer, or the like.

In the arrangement shown in FIG. 5, for example, a charge calculation is performed by the multiplier 702, and the fetching operation of the message corresponding to a user's image request and charge notification are made via the I/O interface 701.

The volume of image information transmitted in the image transmission system is measured by the measuring instrument 703. Note that the arrangement shown in FIG. 5 is used when the product of the unit charge and the information volume is calculated as a charge.

The arrangement that realizes the accounting processing unit of this embodiment is not limited to those described above. For example, the multiplier 702 in FIG. 5 may be replaced by an arbitrary combination of a multiplier, divider, adder, subtracter, and the like, and the accounting processing unit as a whole may be constituted as a single device.

The third embodiment of the present invention will be described below with reference to the accompanying drawings.

In this embodiment, the present invention is applied to allow a user to settle accounts at predetermined time intervals by calculating an accumulated charge in the first and second embodiments described above.

Note that the arrangement of the accounting unit of this embodiment is also substantially the same as that shown in FIG. 1.

Figure 6A:
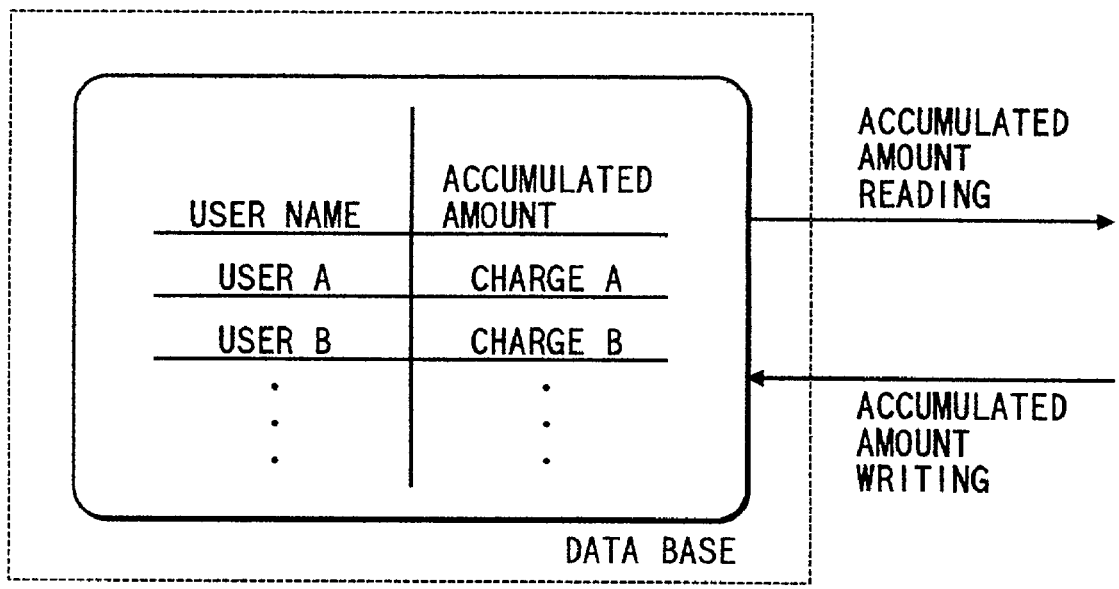
FIGS. 6A and 6B show accumulated charge tables used by an accounting unit according to the third embodiment of the present invention.
Figure 6B:
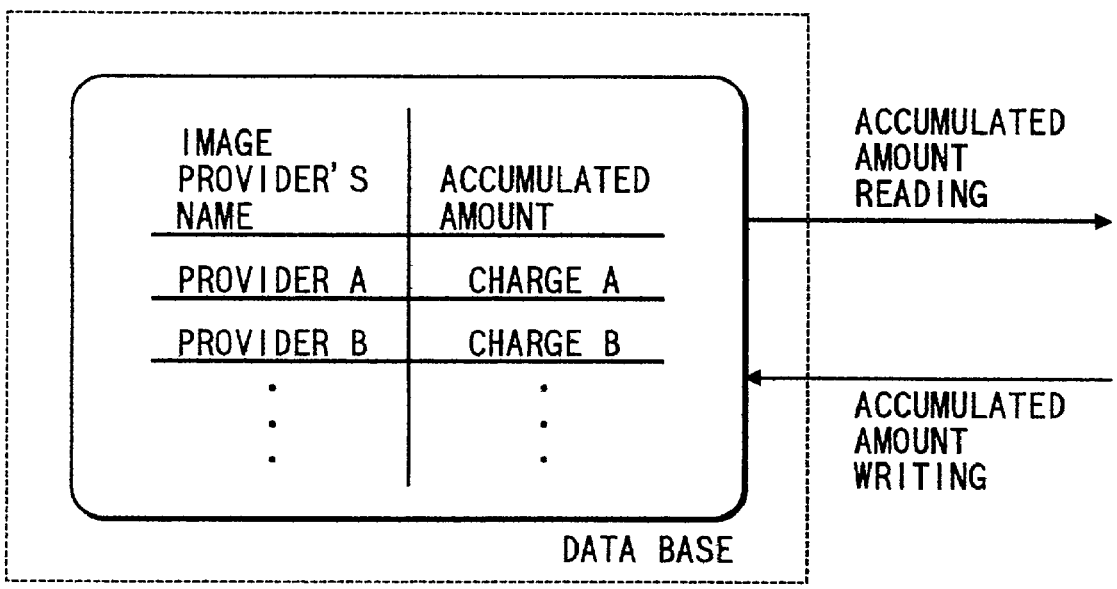

FIGS. 6A and 6B show examples of accumulated amount tables stored in the storage unit of this embodiment. For example, FIG. 6A shows an accumulated amount table used when the accounting unit is arranged in a terminal on the image provider side, and exemplifies a case wherein only Charge A of those for images provided to User A is not paid yet, only Charge B of those for images provided to User B is not paid yet, . . . .

Also, for example, FIG. 6B shows an accumulated amount table used when the accounting unit is arranged in a terminal of the user side, and exemplifies a case wherein only Charge A of those for images provided from provider A is not paid yet, only Charge B of those for images provided from provider B is not paid yet, . . . .

A sequence for calculating the accumulated amount of charges each calculated based on the unit charge and the information volume by the accounting unit of this embodiment will be described below. In the following description, a case will be exemplified wherein User L (user or a user's terminal) requests provider A to transmit image Info 1 at resolution 3.

In the first operation step, the accounting processing unit fetches information that requests to transmit image Info 1 at resolution 3 by monitoring messages transmitted/received in the image transmission system or receiving a message from the image transmission system.

In the second operation step, the accounting processing unit reads out unit charge 13 as a charge per unit information volume for providing image Info 1 at resolution 3 from a charge table (FIG. 3) stored in the storage unit.

In the third operation step, the accounting processing unit measures the information volume of image Info 1 which is being transmitted.

In the fourth operation step, upon completion of transmission of image Info 1, the accounting processing unit detects the end of image Info 1 which is being transmitted to User L by the same method as in the first operation step.

In the fifth operation step, the accounting processing unit calculates the charge on the basis of unit charge 13 and the measured information volume.

In the sixth operation step, the accounting processing unit notifies the image transmission system of the charge.

In the seventh operation step, the accounting processing unit reads out the accumulated charge of User L (or provider A) from an accumulated charge table stored in the storage unit or managed by the image transmission system.

In the eighth operation step, the accounting processing unit calculates the sum of the readout accumulated charge and the charge of the newly provided image as a new accumulated charge.

In the ninth operation step, the accounting processing unit updates the accumulated charge for User L (or provider A) recorded on the accumulated charge table (FIG. 6A or 6B) with the accumulated charge calculated in the eighth operation step. In the above-mentioned operation example, the charge is determined based on the resolution of an image to be provided and the information volume.

Note that this embodiment also includes the following cases. That is, by changing the charge table, a fixed charge in units of images is read out in place of the unit charge in the second operation step, the third and fifth operation steps are skipped, and the sum of the accumulated charge read out in the seventh operation step and charge 13 is set as a new accumulated charge in the eighth operation step.

Also, the fifth and sixth operation steps are performed parallel to the third operation step.

Furthermore, some or all of the seventh to ninth operation steps are performed parallel to the second to sixth operation steps.

Moreover, one of the sixth and ninth operation steps is performed.

In addition, in the ninth operation step, the accounting processing unit outputs the accumulated charge calculated in the eighth operation step to the image transmission system.

Figure 7A:
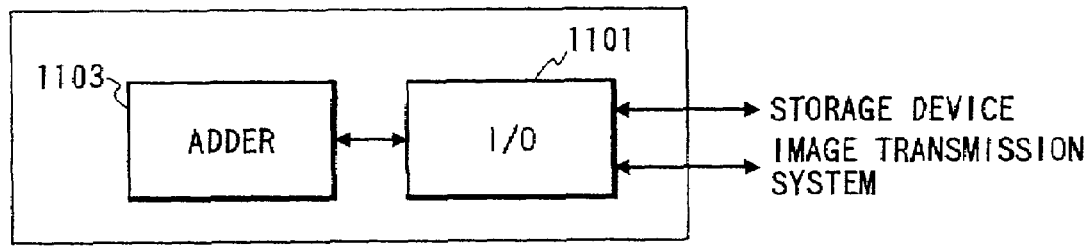
FIGS. 7A and 7B are block diagrams showing the arrangements of accounting processing units in accounting units of the third embodiment.
Figure 7B:
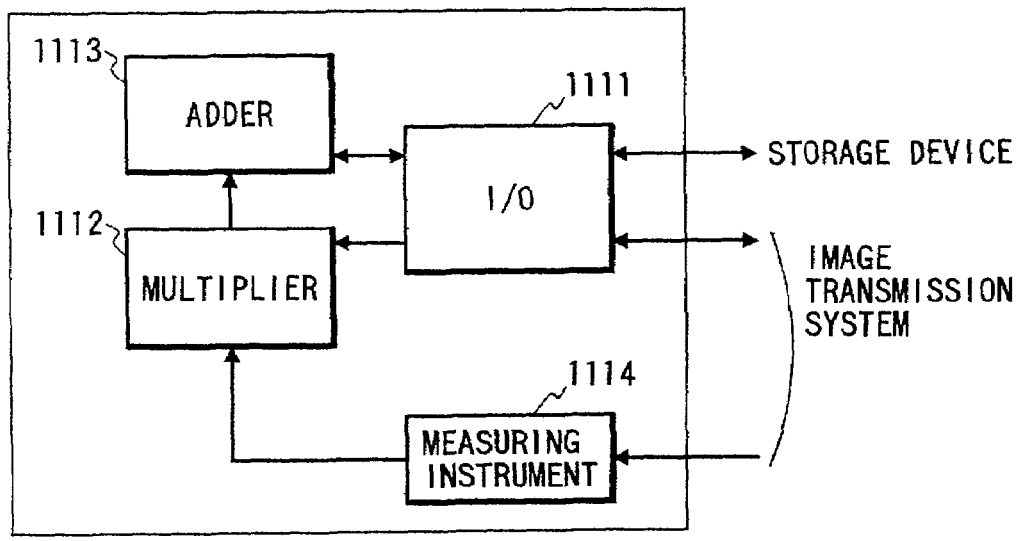

The accounting processing unit of this embodiment may adopt an arrangement shown in FIG. 7A or 7B. Referring to FIG. 7A, an I/O interface 1101 is used for fetching an image request signal transmitted/received in the image transmission system of this embodiment, and reading out a charge from a charge table (e.g., FIG. 3) by accessing the storage unit.

Also, the I/O interface 1101 is used for reading out the accumulated charge stored in the storage unit or managed by the image transmission system, inputting the readout charge and accumulated charge to an adder 1103, and outputting the readout charge or the charge calculated by the adder 1103 to the image transmission system.

The adder 1103 calculates the sum of the charge for an image input from the I/O interface 1101 and the accumulated charge, and outputs the value (sum) as a charge to the I/O interface 1101.

Referring to FIG. 7B, an I/O interface 1111 is used for fetching an image request signal transmitted/received in the image transmission system of this embodiment, reading out a unit charge from a charge table (e.g., FIG. 3) by accessing the storage unit, and inputting the readout charge to a multiplier 1112.

Also, the I/O interface 1111 is used for reading out the accumulated charge from an accumulated charge table (FIG. 6A or 6B), inputting the readout charge and accumulated charge to an adder 1113, and outputting a charge calculated by the multiplier 112 to the image transmission system or outputting the charge calculated by the adder 1113 to the image transmission system.

The multiplier 1112 calculates the product of the unit charge of an image input from the I/O interface 1111 and the information volume measured by a measuring instrument 1114, and outputs the value (product) as a charge to the I/O interface 1111 or the adder 1113.

The adder 1113 calculates the sum of the accumulated charge input from the I/O interface 1111 and the charge supplied from the multiplier 1112 as a new accumulated charge, and outputs it to the I/O interface 1111.

The measuring instrument 1114 measures the volume of image information transmitted/received in the image transmission system of this embodiment, and comprises, e.g., a counter.

In the arrangement shown in FIG. 7A or 7B, for example, a charge calculation is performed by the multiplier 1112 and the adder 1113, and the fetching operation of a message corresponding to a user's image request and charge notification are made via the I/O interface 1111.

Also, the volume of image information transmitted in the image transmission system of this embodiment is measured by the measuring instrument 1114. Note that the arrangement shown in FIG. 7A is used when the information volume is not taken into consideration, and the arrangement shown in FIG. 7B is used when the product of the unit charge and the information volume is set as a charge.

The arrangement that realizes the accounting processing unit of this embodiment is not limited to the above-mentioned arrangements, but various modifications may be made. For example, in FIG. 7A or 7B, the multiplier 1112 and the adder 1113 may be replaced by an arbitrary combination of a multiplier, divider, adder, subtracter, and the like, and the accounting processing unit as a whole may be constituted as a single device.

The fourth embodiment of an image transmission system according to the present invention will be described below with reference to the accompanying drawings.

Figure 8:
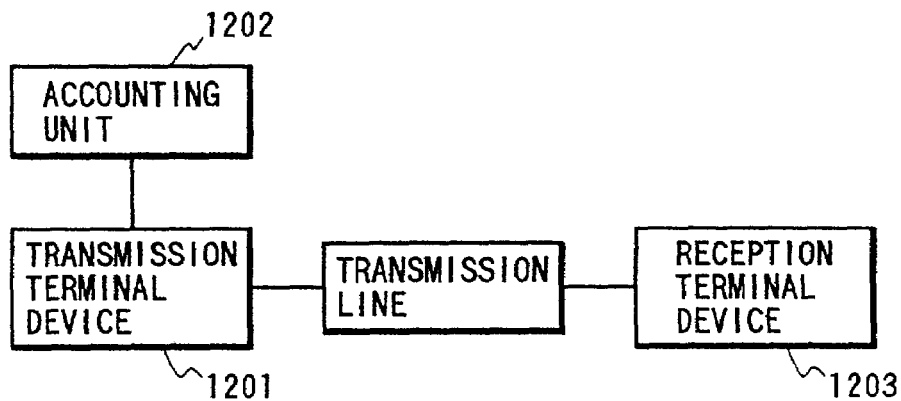
FIG. 8 is a block diagram showing the overall arrangement of an image transmission system according to the fourth embodiment of the present invention.

FIG. 8 shows a case wherein an image provider (or his or her terminal device) has one of the accounting units described in the first to third embodiments.

Referring to FIG. 8, a transmission terminal device 1201 on the image provider side comprises a computer such as a personal computer, a workstation, or the like, or an image transmitter who has an accounting unit.

An accounting unit 1202 is equivalent to one of the accounting units described in the first to third embodiments, and a reception terminal device 1203 on the user side comprises a computer such as a personal computer, a workstation, or the like, or an image receiver.

The operation of this embodiment will be described below with reference to FIG. 9. In the following description, a case will be exemplified wherein User L (the reception terminal device 1203) requests provider A (the transmission terminal device 1201) to transmit image Info 1 at resolution 3 when the accounting unit of the second embodiment is used.

In the first operation step [S1], User L transmits a message that requests provider A to transmit image Info 1 at resolution 3 to provider A via a transmission line (the message will be referred to as an image transmission request message hereinafter). When the image transmission request message is received by the terminal device 1201 of provider A, the accounting unit 1202 fetches the image transmission request message from the transmission terminal equipment 1201.

In the second operation step [S2], the accounting unit 1202 reads out, from a charge table (FIG. 3), unit charge 13 incurred when image Info 1 is provided at resolution 3.

In the third operation step [S3], the transmission terminal device 1201 transmits hierarchically encoded image data Info 1 at resolution 3 to User L via the transmission line. At the same time, the accounting unit 1202 measures the information volume of Info 1, which is being transmitted.

In the fourth operation step [S4], the accounting unit 1202 monitors Info 1 which is being transmitted. When the accounting unit 1202 recognizes the end of transmission of Info 1 to User L by detecting a bit pattern indicating the end of the image or receiving a message indicating the end of transmission of Info 1 to User L from the transmission terminal device 1201, it calculates the charge for User L on the basis of the information amount of Info 1 provided to User L and unit charge 13.

In the fifth operation step [S5], the accounting unit 1202 outputs the charge information calculated in the fourth operation step [S4] to the transmission terminal device 1201. The transmission terminal device 1201 notifies User L of the charge via the transmission line.

In the sixth operation step [S6], the charge is paid.

Note that this embodiment also includes the following cases.

More specifically, in the first operation step [S1], upon requesting an image, the user may designate a terminal device (or an image processing apparatus) as a destination of the image, and provider A may transmit image information to the designated destination.

In the second operation step [S2], after unit charge 13 is read out, the readout unit charge information may be output to the transmission terminal device 1201, and may then be transmitted to User L via the transmission line.

In the third operation step [S3], the charge incurred so far may be calculated based on unit charge 13 and the information volume at that time, and the calculated charge information may be output to the transmission terminal device 1201 to notify provider A or User L of the charge.

The accounting unit 1202 may be realized by utilizing a CPU, a memory, a storage device, and the like of the transmission terminal device 1201.

The accounting unit of the first or third embodiment may be adopted.

The fifth embodiment of the present invention will be described below with reference to the accompanying drawings.

Figure 10:
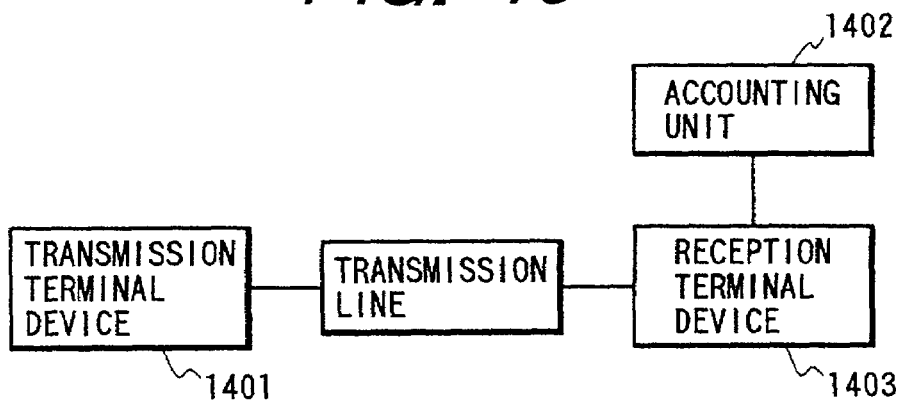
FIG. 10 is a block diagram showing the overall arrangement of an image transmission system according to the fifth embodiment of the present invention.

FIG. 10 shows a case wherein a user (or his or her terminal device) has one of the accounting units described in the first to third embodiment.

Referring to FIG. 10, a transmission terminal device 1401 on the image provider side comprises a computer such as a personal computer, a workstation, or the like, or an image transmitter, which comprises an accounting unit.

An accounting unit 1402 is equivalent to one of those described in the first to third embodiments described above. A reception terminal device 1403 on the receiver side comprises a computer such as a personal computer, a workstation, or the like, or an image receiver.

Figure 11:
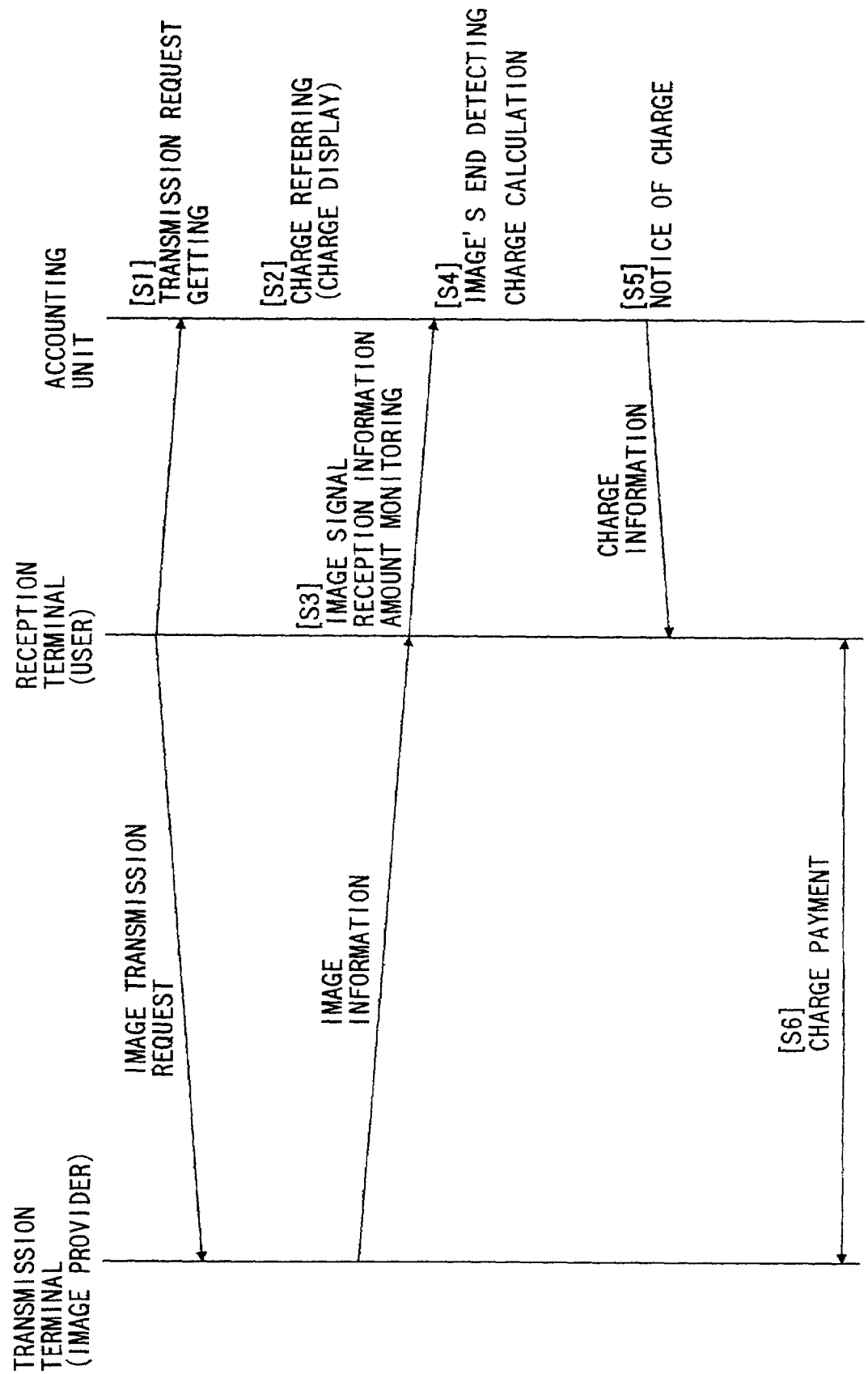
FIG. 11 is a chart showing the operation sequence of the image transmission system of the fifth embodiment.

The operation of this embodiment will be described below with reference to FIG. 11. In the following description, a case will be exemplified wherein User L (the reception terminal device 1403) requests provider A (the transmission terminal device 1401) to transmit image Info 1 at resolution 3 when the accounting unit of the second embodiment is used.

In the first operation step [S1], User L transmits a message that requests provider A to transmit image Info 1 at resolution 3 to provider A via a transmission line (the message will be referred to as an image transmission request message hereinafter). The accounting unit 1402 fetches the image transmission request message from the reception terminal device 1403.

In the second operation step [S2], the accounting unit 1402 acquires unit charge 13 incurred when image Info 1 is provided at resolution 3, with reference to a charge table (FIG. 3) stored in a storage unit in the accounting unit 1402.

In the third operation step [S3], the transmission terminal device 1401 transmits hierarchically encoded image data Info 1 at resolution 3, and the reception terminal device 1403 receives data Info 1. The accounting unit 1402 measures the information volume of Info 1 which is being received.

In the fourth operation step [S4], the accounting unit 1402 monitors Info 1 which is being received, and recognizes the end of transmission of Info 1 from provider A by detecting a bit pattern indicating the end of the image or receiving a message indicating the end of reception of Info 1 from provider A from the reception terminal device 1403. Then, the accounting unit 1402 calculates the charge payable to provider A on the basis of the information volume of Info 1 received from provider A, and unit charge 13.

In the fifth operation step [S5], the charge information calculated in the fourth operation step [S4] is output to the reception terminal device 1403.

In the sixth operation step [S6], the charge is paid.

Note that this embodiment also includes the following cases.

More specifically, in the first operation step [S1], upon requesting an image provider to transmit an image, a user may designate a terminal device (or image processing apparatus) as a destination, and provider A transmits image information to the designated destination. This case further includes the following two cases.

In the first case, the user has an accounting unit. In this case, the user (or his or her accounting unit) is notified of the start of transmission of an image from the destination or the image provider before the image begins to be provided (the second operation step [S2]), so as to start an accounting operation, and is also notified of the end of transmission of the image upon completion of providing the image (the fourth operation step [S4]), so as to end the accounting operation. As for the information volume, the user is notified of it from the destination or the provider.

In the second case, the destination designated by the user has an accounting unit. In this case, the user also transmits an image transmission request message to the destination in the first operation step [S1], and the accounting unit of the destination fetches the image transmission request message. The accounting unit of the destination notifies the provider or user of the charge in the fifth operation step [S5].

In the second operation step [S2], after unit charge 13 is read out, the readout charge information may be output to the reception terminal device 1403, and may be displayed on the reception terminal device 1403, thus notifying User L of the unit charge.

In the third operation step [S3], the charge incurred so far may be calculated on the basis of unit charge 13 and the information volume of Info 1 received at that time, and the calculated charge may be output to and displayed by the reception terminal device 1403, thus notifying User L of the charge.

The accounting unit 1402 may be realized by utilizing a CPU, a memory, a storage device, and the like of the reception terminal device 1403. Furthermore, the accounting unit of the first or third embodiment may be used.

The sixth embodiment of the present invention will be described below with reference to the accompanying drawings.

Figure 12:
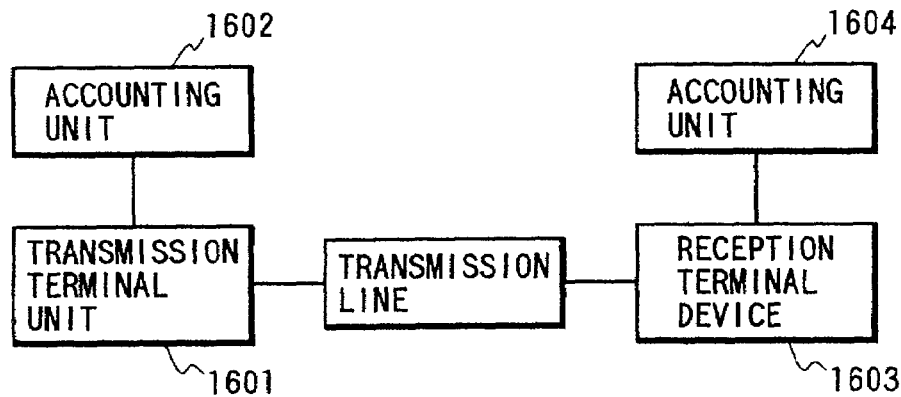
FIG. 12 is a block diagram showing the overall arrangement of an image transmission system according to the sixth embodiment of the present invention.

FIG. 12 shows a case wherein both an image provider (or his or her terminal device) and a user (or his or her terminal device) have corresponding ones of the accounting units described in the first to third embodiments above.

Referring to FIG. 12, a transmission terminal device 1601 on the image provider side comprises a computer such as a personal computer, a workstation, or the like, or an image transmitter, which comprises an accounting unit 1602.

The accounting unit 1602 is equivalent to one of the accounting units described in the first to third embodiments. A reception terminal device 1603 on the user side comprises a computer such as a personal computer, a workstation, or the like, or an image receiver, which comprises an accounting unit 1604. The accounting unit 1604 is equivalent to one of the accounting units described in the first to third embodiments.

Figure 13:
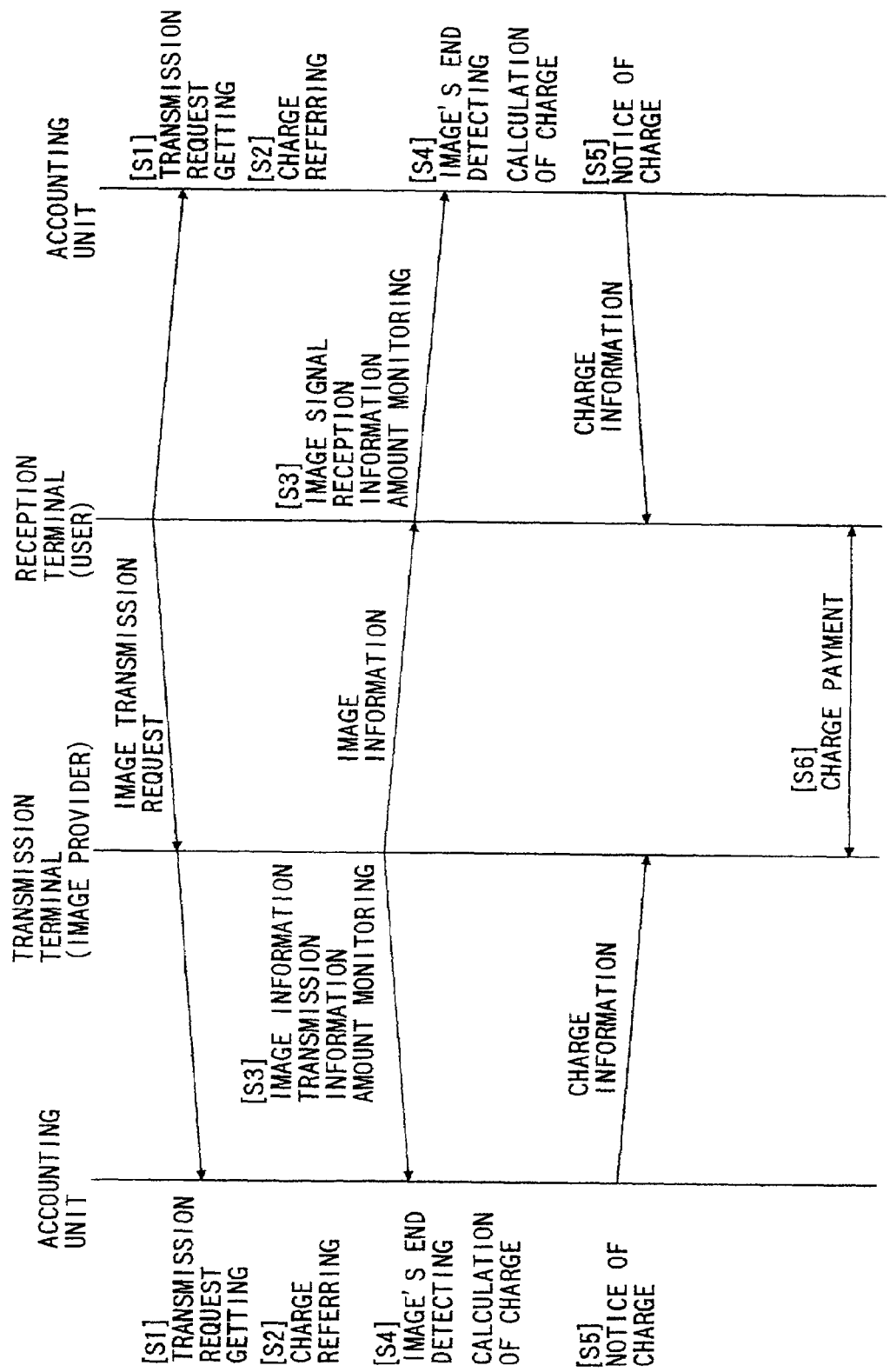
FIG. 13 is a chart showing the operation sequence of the image transmission system of the sixth embodiment.

The operation of this embodiment will be described below with reference to FIG. 13. In the following description, a case will be exemplified wherein User L (the reception terminal device 1603) requests provider A (the transmission terminal device 1601) to transmit image Info 1 at resolution 3 when the accounting unit of the second embodiment is used.

In the first operation step [S1], User L transmits a message that requests provider A to transmit image Info 1 at resolution 3 to provider A via a transmission line (the message will be referred to as an image transmission request message hereinafter).

When the image transmission request message is received by the transmission terminal device 1601 of provider A, the accounting unit 1603 fetches the image transmission request message from the transmission terminal device 1601.

Also, the accounting unit 1604 on the User L side fetches the image transmission request message from the reception terminal device 1603.

In the second operation step [S2], the accounting unit 1602 on the provider A side reads out unit charge 13 incurred when image Info 1 is provided at resolution 3 from a charge table (FIG. 3).

Similarly, the accounting unit 1604 on the User L side obtains unit charge 13 with reference to a charge table (FIG. 3).

In the third operation step [S3], the transmission terminal device 1601 reads out hierarchically encoded image data Info 1 at resolution 3, and transmits it to User L via the transmission line. The accounting unit 1602 measures the information volume of data Info 1, which is being transmitted.

The reception terminal device 1603 receives data Info 1. The accounting unit 1604 measures the information volume of data Info 1, which is being received.

In the fourth operation step [S4], the accounting unit 1602 monitors data Info 1 which is being transmitted. When the accounting unit 1602 recognizes the end of transmission of Info 1 to User L by detecting a bit pattern indicating the end of the image or receiving a message indicating the end of transmission of Info 1 to User L from the transmission terminal device 1601, it calculates the charge for User L on the basis of the information amount of Info 1 provided to User L and unit charge 13.

The accounting unit 1604 monitors Info 1 which is being received, and recognizes the end of transmission of Info 1 from provider A by detecting a bit pattern indicating the end of the image or receiving a message indicating the end of reception of Info 1 from provider A from the reception terminal device 1603. Then, the accounting unit 1604 calculates the charge payable to provider A on the basis of the information volume of Info 1 received from provider A, and unit charge 13.

In the fifth operation step [S5], the accounting unit 1602 outputs the charge calculated in the above-mentioned fourth operation step [S4] to the transmission terminal device 1601. The transmission terminal device 1601 notifies User L of the charge via the transmission line.

The accounting unit 1604 outputs the charge calculated in the above-mentioned fourth operation step [S4] to the reception terminal device 1603. The reception terminal device 1603 notifies User L of the charge by displaying it.

In the sixth operation step [S6], the charge is paid.

Note that this embodiment also includes the following cases.

More specifically, upon requesting an image provider to transmit an image, a user may designate a terminal device (or image processing apparatus) as a destination, and provider A transmits image information to the designated destination. This case further includes the following two cases.

In the first case, the provider and user have accounting units. In this case, the user (or his or her accounting unit) is notified of the start of transmission of an image from the destination or the image provider before the image begins to be provided (the second operation step [S2]), so as to start an accounting operation. Furthermore, the user is also notified of the end of transmission of the image upon completion of providing the image (the fourth operation step [S4]), so as to end the accounting operation. As for the information volume, the user is notified from the destination or the provider.

In the second case, the provider and the destination designated by the user have accounting units. In this case, the user also transmits an image transmission request message to the destination in the first operation step [S1], and the accounting unit of the destination fetches the image transmission request message. Alternatively, the accounting unit of the destination may notify the user of the charge in the fifth operation step [S5].

In the second operation step [S2], the accounting unit 1604 may read out unit charge 13 and may output it to the reception terminal device 1603. The reception terminal device 1603 may display the received charge information, thus notifying User L of the charge.

In the third operation step [S3], the accounting unit 1604 calculates the charge incurred so far on the basis of unit charge 13 and the information volume of Info 1 received at that time, and may output and display the charge on the reception terminal device 1603, thus notifying User L of the calculated charge.

In the fifth operation step [S5], notification of the charge from provider A (the transmission terminal device 1601) to User L (user) may be omitted.

The accounting unit 1602 may be realized by utilizing a CPU, a memory, a storage device, and the like of the transmission terminal device 1601.

The accounting unit 1604 may similarly be realized by utilizing a CPU, a memory, a storage device, and the like of the reception terminal device 1603.

The accounting unit of the first or third embodiment may be used.

All the networks using the above-mentioned accounting unit are embodiments according to the present invention. Especially, a preferred embodiment of a network using the accounting unit of this embodiment will be explained below.

The seventh embodiment of the present invention will be described below with reference to the accompanying drawings.

Figure 14:
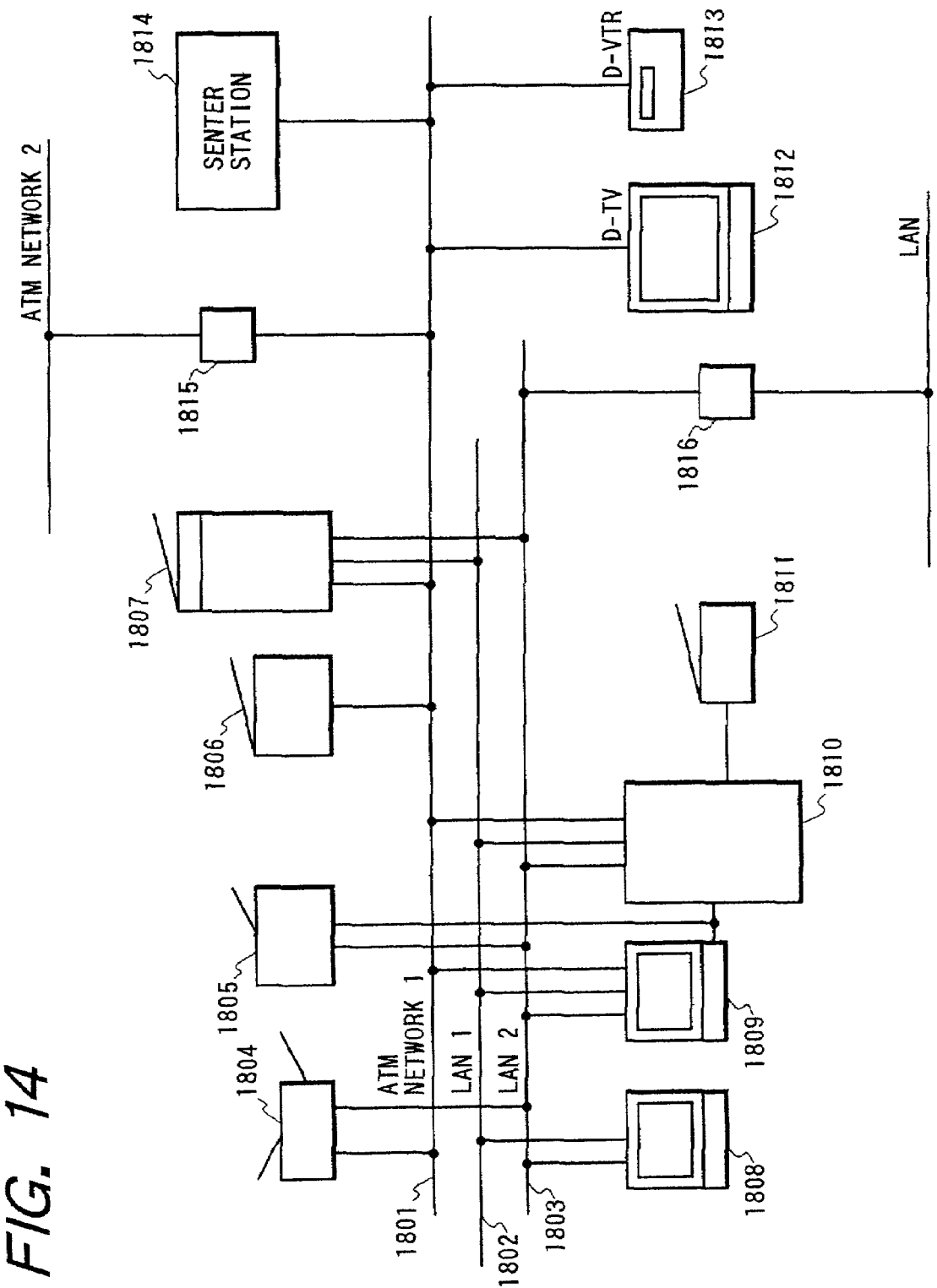
FIG. 14 is a block diagram showing the entire network according to the seventh embodiment of the present invention.

FIG. 14 is a block diagram showing the entire network of this embodiment. Referring to FIG. 14, an ATM (Asynchronous Transfer Mode; to be described later) network 1801 transfers data in the ATM.

Local area networks (LANs) 1802 and 1803 using Ethernet or the like transfer data in a mode other than the ATM. To these networks, for example, the following apparatuses are connected.

A facsimile apparatus 1804 is connected to the ATM network and LAN. A color printer 1805 has an internal page memory. A color copying machine 1806 includes a color scanner and a color printer. The color copying machine 1806 also includes a page memory for storing image data of an original read by the color scanner, and a circuit for reading out data written in the page memory and supplying the readout data to the printer.

A file server 1807 temporarily stores image data input via the ATM network. A workstation 1808 inputs/outputs data to/from the file server. A terminal device 1809 is connected to the ATM network. The terminal device 1809 exchanges data with the above-mentioned LANs and performs various processing operations such as editing for image data. The terminal device 1809 is also connected to the printer 1805 via the network line (LAN) 1803 or a dedicated line. A server 1810 has the same arrangement as that of the file server 1807.

The server 1810 is connected to a color copying machine 1811 similar to the above-mentioned color copying machine 1806.

A digital television 1812 is connected to the ATM network. The digital television 1812 receives data via the ATM network, and displays the data as a visible image on its display device.

A VTR 1813 receives image data via the ATM network.

A center station 1814 such as a CATV station outputs various software data and image data to the ATM network.

A first router 1815 connects another ATM network to the ATM network, and a second router 1816 connects another LAN.

An ATM network switch (not shown) is arranged between the ATM network and each of the apparatuses connected to the ATM network such as the facsimile apparatus 1804, the printer 1805, the color copying machine 1807, and the like. Note that these apparatuses comprise accounting units described in the first to the third embodiments as needed.

Figure 15:
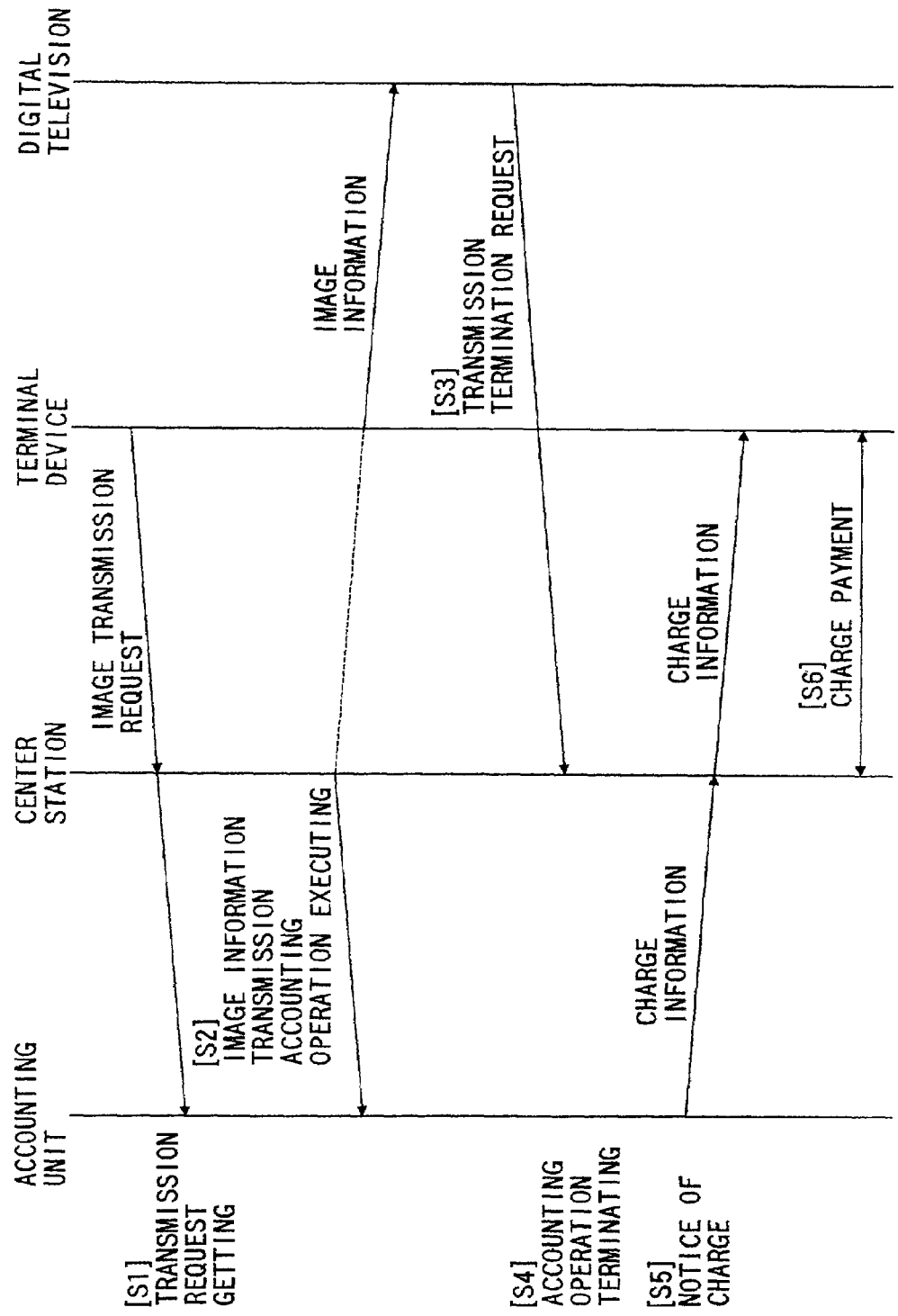
FIG. 15 is a chart for explaining the accounting sequence in the system of the seventh embodiment.

FIG. 15 shows as an example a case wherein the center station 1814 comprises an accounting unit (fourth embodiment), and the terminal device 1809 as a user issues a request to the center station 1814 as a transmitter while designating the digital television 1812 as an image destination, so as to explain the accounting operation in the above-mentioned arrangement.

In the first operation step [S1], the terminal device 1809 issues a transmission request to the center station 1814, and designates an image, its resolution, and the digital television 1812 as its destination.

At this time, the accounting unit fetches the transmission request from the center station 1814 that received the transmission request.

In the second operation step [S2], the center station 1814 transmits image data to the digital television 1812, and the digital television 1812 receives the image data.

At this time, the accounting operation is executed as in the fourth embodiment, and the charge to be paid by the terminal device 1809 (or its user) to the center station 1814 is calculated.

In the third operation step [S3], the terminal device 1809 or the digital television 1812 sends a transmission termination request to the center station 1814 when it wants to terminate data reception during transmission of the image.

In the fourth operation step [S4], the center station 1814 terminates supply of image data in accordance with the transmission termination request.

The accounting unit ends its accounting operation by detecting the end of supply of the image data.

In the fifth operation step [S5], the center station 1814 notifies the terminal device 1809 of the charge calculated using the accounting unit.

In the sixth operation step [S6], payment of the charge is performed between the center station 1814 and the terminal device 1809.

If data transfer is performed bidirectionally, an accounting operation similar to that described above is performed while replacing the transmitting and receiving sides each other.

Note that this embodiment also includes the following cases.

More specifically, when the terminal device 1809 comprises an accounting unit without arranging any accounting unit in the center station 1814, the accounting unit may fetch the transmission request from the terminal device 1809 in the first operation step [S1].

When an image begins to be provided, the center station 1814 or the digital television 1812 supplies a message indicating the start of image provision to the terminal device 1809. Upon completion of image provision, the center station 1814 or the digital television 1812 supplies a message indicating the end of image provision to the terminal device 1809.

The accounting unit starts the accounting operation as described in the fourth embodiment upon detection of the message indicating the start of image provision, and ends the accounting operation upon detection of the message indicating the end of image provision. In this case, the fifth operation step [S5] of this embodiment is omitted.

When the digital television 1812 comprises an accounting unit without arranging any accounting unit in the center station 1814 or the terminal device 1809, the accounting unit fetches the transmission request from the digital television 1812 in the first operation step [S1]. In this case, the accounting operation is performed, as described in the fifth embodiment. In the fifth operation step [S5] of this embodiment, the digital television 1812 notifies one or both of the center station 1814 and the terminal device 1809 of the charge.

The operation executed when at least both the center station 1814 and the terminal device 1809 comprise accounting units is apparent from that explained in the sixth embodiment. In this case, data exchange not only between the center station and the digital television but also between other terminal devices can be charged.

Figure 16:
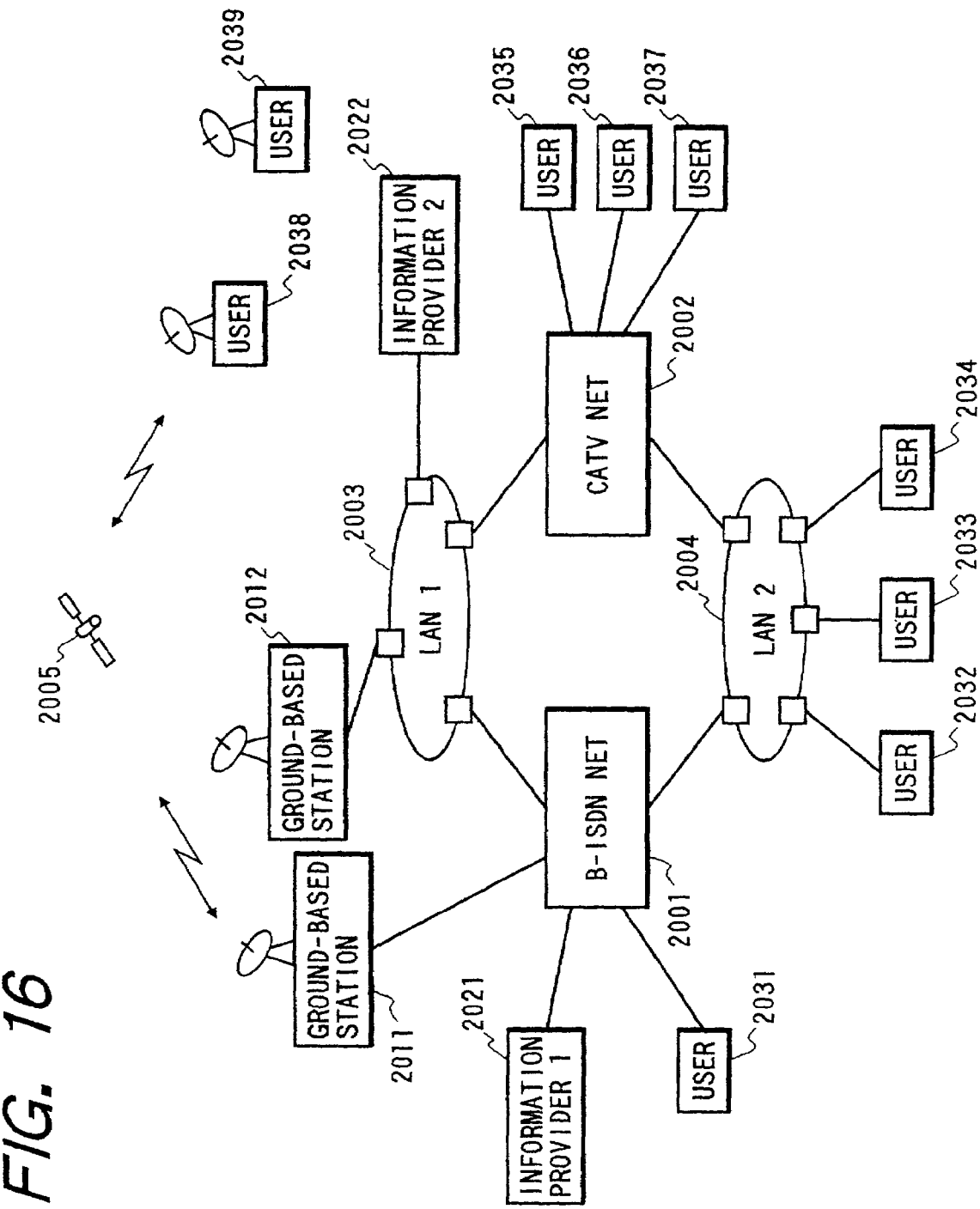
FIG. 16 is a diagram showing an example of the concept of a multimedia network system to which the present invention is applied.

The eighth embodiment of the present invention will be described below. FIG. 16 shows an example of the concept of a multimedia network system to which the present invention is applied.

Referring to FIG. 16, a B-ISDN network 2001 using a high-speed public network and a cable television (CATV) network 2002 are connected to each other via LANs (local area networks) 2003 and 2004.

Ground-based stations 2011 and 2012 perform information communications via a communication satellite 2005. Information providers 2021 and 2022 provide various kinds of multimedia information such as video information, audio information and the like by utilizing these communication networks, and charge for the information provided. Users 2031 to 2039 utilize information provided by the information providers and pay charges for the information.

The B-ISDN network 2001, the CATV network 2002, the LANs 2003 and 2004, and the communication satellite 2005 are connected to each other and can exchange information with each other (bidirectional communications). The information providers 2021 and 2022, and the users 2031 to 2039 are connected to corresponding ones of these communication networks.

The information providers 2021 and 2022 have accounting units described in the first to third embodiments. Since bidirectional communications can be made, if both the information providers and users have accounting units, an information provider may become a user and vice versa.

The accounting unit may be incorporated in each apparatus, may be inserted between each apparatus and the network, or may be connected to each apparatus as an external device.

Figure 17:
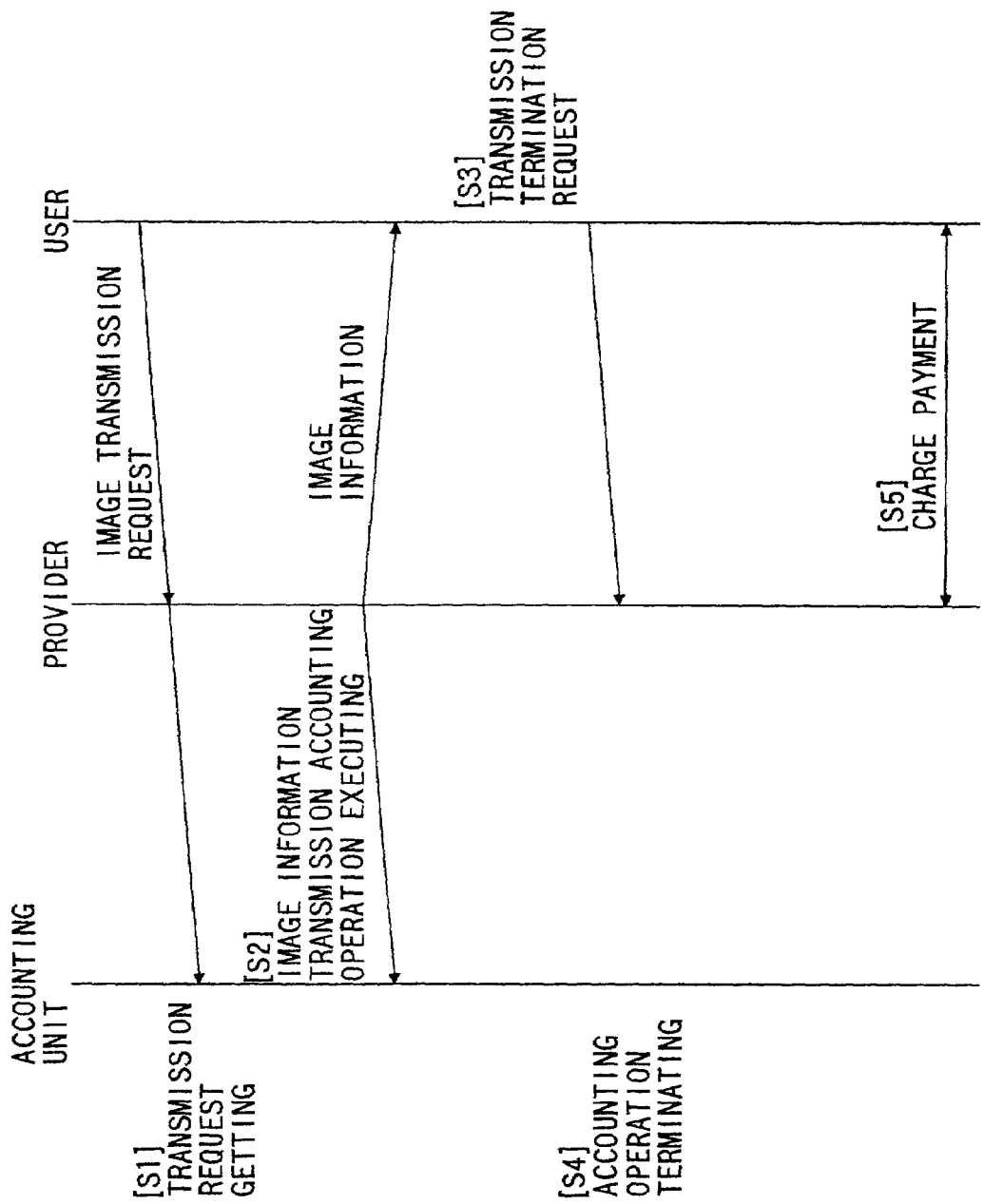
FIG. 17 is a chart for explaining the accounting sequence in a system according to the eighth embodiment of the present invention.

A case will be explained below with reference to FIG. 17 wherein the user 2039 subscribes to the use of information provided by the information provider 2022, and the user 2039 is charged for information provided by the information provider 2022 when only the provider has an accounting unit. In the following description, the transmission line includes the second LAN 2004, the B-ISDN network 2001, the CATV network 2002, and the first LAN 2003.

In the first operation step [S1], the user 2039 sends an image transmission request to the information provider 2022 via the transmission line.

In the second operation step [S2], the information provider 2022 provides hierarchically encoded image information to the user 2039 via the transmission line in accordance with the request sent from the user 2039. During this interval, the accounting operation described in the fourth embodiment is executed.

In the third operation step [S3], the user 2039 sends a transmission termination request when he or she wants to terminate reception of image during transmission of the image.

In the fourth operation step [S4], the information provider terminates transmission of an image in accordance with the transmission termination request. Also, the accounting unit terminates the above-mentioned accounting operation.

In the fifth operation step [S5], the charge incurred is paid.

When the user has an accounting unit in the above-mentioned network, the accounting unit described in the fifth embodiment operates. On the other hand, when both the provider and the user have accounting units, the accounting units described in the sixth embodiment operate. As can be seen from the above description, similar accounting processing can be made for other users and other information providers.

The ninth embodiment of the present invention will be described below. In an image transmission system of this embodiment, when information (an image request signal, image information, information relating to accounting, and the like) is transmitted via a transmission line between a transmitting station and a receiving station, the following breaches of security may be attempted by ill-disposed persons:

1. A third party taps image information without paying charges for the received information.

2. A third party disguises himself or herself as another receiving station, and requests and receives information.

3. A receiving station falsifies charge information for payment after information is received.

4. A receiving station forges receipt information without paying charges for the received information.

As countermeasures against such illicit acts, the accounting unit described in the first to eighth embodiment may be combined with the following cipher unit. In this case, in FIGS. 8, 10, and 12, the transmission terminal device and the reception terminal device can comprise the following cipher unit. The cipher unit may be assigned to image data in units of hierarchical layers, and the operation time of the cipher unit and the information volume processed by the cipher unit may be used as parameters for charge calculations.

The cipher technique will be explained below. The cipher technique can be roughly classified into a common key cipher system and a public key cipher system. The common and public key cipher systems will be described below.

The common key cipher system will be described first. The common key cipher system is a cipher system in which a transmitter and a receiver share an identical cipher key in secrecy (also called a secret key cipher system, a symmetric cipher system, or a usual cipher system).

The common key cipher system can be classified into a block cipher for ciphering data in units of character strings (blocks) each having an appropriate length using an identical key, and a stream cipher that changes keys in units of character strings or bits.

The block cipher includes a transposition cipher for ciphering data by transposing the order of characters, a substitution cipher for ciphering data by substituting characters with other characters, and the like. In this case, a correspondence table for transposition or substitution serves as a cipher key. As the stream cipher, a Vigenere cipher using multiple tables, a Vernam cipher using a key which is used only once, and the like are known (for the details of the ciphers, refer to Chapters 2 and 4 of Ikeno & Koyama, "Theory of Modern Cipher", *The institute of Electronics, Information and Communication Engineers* (1986)).

Of the block cipher, ciphers such as DES (Data Encryption Standard), FEAL (Fast data Encipherment ALgorithm), and the like, whose algorithms are open to the public (for the details, Tsujii & Kasahara, "Cipher and Information Security", Shokodo, 1990) are widely used as commercial ciphers.

The public key cipher system will be explained below. The public key cipher system is a cipher system in which an encipher key and a decipher key are different from each other, the encipher key is open to public, and the decipher key is held in secrecy. The features of the public key cipher are as summarized in (1), (2), and (3) below.

(1) Since an encipher key and a decipher key are different from each other and the encipher key can be open to the public, the encipher key need not be distributed in secrecy, resulting in easy key distribution.

(2) Since the encipher keys of users are open to the public, each user need only store his or her own decipher key in secrecy.

(3) An authentication function with which a receiver confirms if the transmitter of a sent message is not a pretender and the message is not forged can be realized. This function is also called a digital signature. As typical systems, the following cipher systems have been proposed.

That is, RSA cipher, R cipher, W cipher, MI cipher, MH cipher, GS cipher, CR cipher, M cipher, E cipher, T cipher, S cipher, L cipher, GMY cipher, GMR cipher, OSS cipher, OS cipher, and the like are known (for the details of the ciphers, refer to Chapters 5 to 8 of Ikeno & Koyama, "Theory of Modern Cipher", *The institute of Electronics, Information and Communication Engineers* (1986)).

As described above, according to the above embodiments of the present invention, since accounting processing can be performed in correspondence with the resolution of image information, an accounting system that can fully utilize the features such as the types and qualities of information and services can be realized. With this system, various kinds of information and services can be copied with.

According to the above embodiments of the present invention, accounting processing can be performed in correspondence with the hierarchical encoding technique.

According to another feature, an illicit act against information transmitted/received in an image transmission system can be prevented.

According to another feature, the transmission format of data can be designated in correspondence with the traffic state of a network.

The preferred embodiments of another image transmission system according to the present invention will be described below.

In the embodiments to be described below, the present invention is applied to set the resolutions (layers) of an image to be transmitted in correspondence with the traffic of a transmission line and to set the charge for the image in accordance with the resolution to cope with hierarchical encoding in a transmission system that transmits hierarchically encoded image information via the transmission line.

In particular, the first embodiment of this system will explain in detail an accounting unit that performs accounting processing in a charge system that uniformly charges in units of layers (resolutions) of information.

The second embodiment will explain in detail an accounting unit used in a charge system that takes into consideration the information volume as well as the layers (resolutions) of information.

The third embodiment will explain in detail an accounting unit used when accounts are settled at predetermined time intervals in the first and second embodiments.

The fourth embodiment will explain in detail a case wherein the image provider side has one of the accounting units described in the first to third embodiments.

The fifth embodiment will explain in detail a case wherein the image receiver side has one of the accounting units described in the first to third embodiments.

The sixth embodiment will explain in detail a case wherein both the image provider and receiver sides have corresponding ones of the accounting units described in the first to third embodiments.

The seventh embodiment will explain in detail a case wherein the accounting units described in the first to sixth embodiments are applied to communications between equipments connected to a local area network.

The eighth embodiment will explain in detail a case wherein the accounting units described in the first to sixth embodiments are applied to communications between equipments connected to a wide area network.

The ninth embodiment will explain in detail a case wherein a cipher unit is combined with one of the accounting units described in the fourth to eighth embodiments so as to protect information from being tapped or altered, and to perform fair accounting processing.

The first embodiment of this system according to the present invention will be described below with reference to the accompanying drawings.

The operation of the image transmission system will be briefly described below. First, the above-mentioned hierarchical encoding is performed for an image to be transmitted.

Second, the use condition of a transmission line is checked, and if a sufficient capacity is available, frames of all the layers of the image information are transmitted.

On the other hand, if a sufficient capacity for sending information of all the layers is not available, information is transmitted in the order from information of layer 1 to those of upper layers within the range that the currently available capacity of the transmission line allows. Such transmission method becomes an important element technique upon processing of multimedia information in, e.g., a LAN.

However, this system does not depend on the type or quality of information or services, and does not perform accounting processing to cope with hierarchically encoded image data. The present invention has been made in consideration of such situation, and has as its object to realize accounting processing that can cope with the hierarchical encoding technique.

Figure 19:
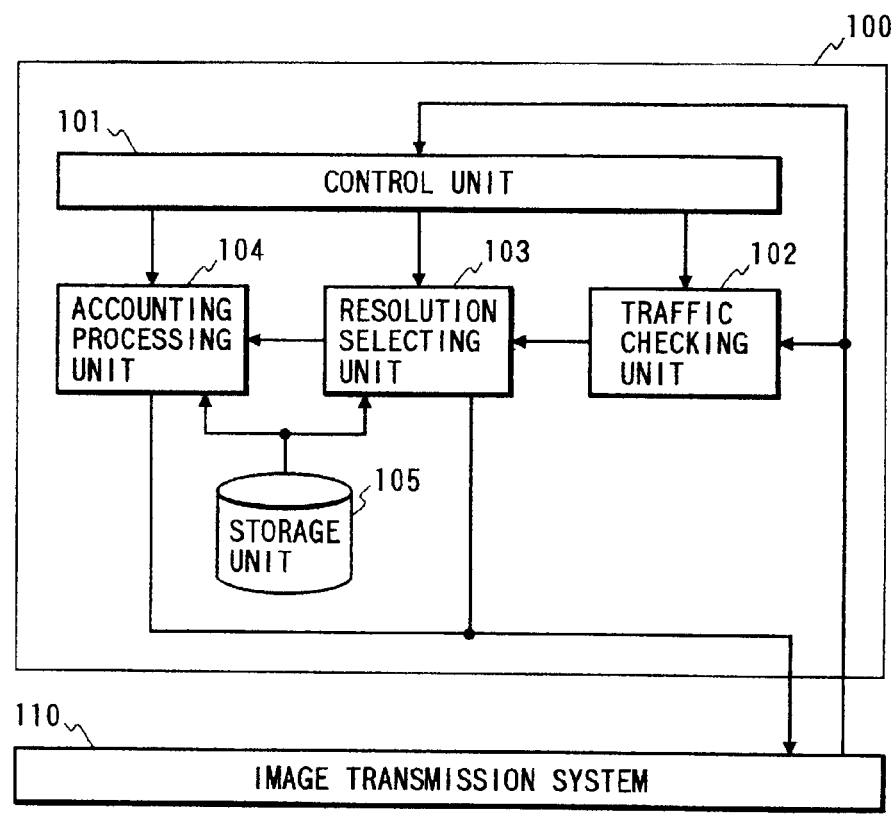
FIG. 19 is a functional block diagram showing an accounting unit according to the first embodiment of the present invention.

FIG. 19 is a functional block diagram showing principal part of an accounting unit according to an image transmission system of the present invention. Referring to FIG. 19, an image transmission system 110 comprises an accounting unit 100. A control unit 101 fetches image transmission requests from users transmitted/received in the image transmission system, controls the operations of a traffic checking unit 102, a resolution (transmission mode) selecting unit 103, and an accounting processing unit 104, and also controls to notify the selecting unit 103 and the accounting processing unit 104 of an identifier (the name or code for specifying an image) of a requested image.

The traffic checking unit 102 checks the transmittable capacity (traffic information) at that time by monitoring the image transmission system 110 or by inquiring of the image transmission system 110 as to information associated with the traffic managed thereby, and notifies the resolution selecting unit 103 of the checking result.

The resolution selecting unit 103 receives the identifier of a requested image from the control unit 101 and traffic information of the image transmission system from the traffic checking unit 102, selects a resolution upon transmission of the image in accordance with the traffic information (the resolution selecting method will be described later), and notifies the accounting processing unit 104 and the image transmission system 110, which perform accounting processing, of the selected resolution.

The accounting processing unit 104 fetches an image identifier from the control unit 101, and also fetches resolution information from the resolution selecting unit 103. The accounting processing unit 104 reads out a charge corresponding to the fetched image identifier and resolution information from a storage unit 105, and notifies the image transmission system 110 of the readout charge information.

The storage unit 105 stores charge information of images to be referred to by the accounting processing unit 104.

The image transmission system 110 is constituted by a network, and terminals such as computers, receivers, printers, monitors, and the like, which are connected to the network via lines or by radio. Note that the respective functions need not always be divided as described above, but a plurality of functional blocks may constitute a single functional block, or an arbitrary one of the above-mentioned functional blocks may be divided into a plurality of blocks.

The traffic checking method in the traffic checking unit 102 will be described below while taking as an example a case wherein the image transmission system 110 is realized by an ATM (Asynchronous Transfer Mode).

The traffic checking unit 102 inquires of the image transmission system 110 as to whether or not data can be transmitted at a certain transmission rate Cr. If the image transmission system 110 denies transmission at the transmission rate Cr, the unit 102 inquires of the image transmission system 110 as to transmission at a transmission rate C'r (C'r<Cr) until permission is granted. On the other hand, if the image transmission system 110 grants permission to transmit at the transmission rate Cr, the unit 102 sets the transmission rate Cr as a checking value.

In an image transmission system constituted by another network system, a traffic checking method other than that mentioned above may be performed in correspondence with the network. More specifically, the traffic checking method of this embodiment is not limited to the above-mentioned example of the ATM.

An example of the resolution selecting method in the resolution selecting unit 103 will be explained below.

The resolution selecting unit 103 receives information associated with the traffic of the image transmission system 110 from the traffic checking unit 102, and also receives the identifier of a requested image from the control unit 101.

The resolution selecting unit 103 compares transmission capacities (information stored in the storage unit 105 will be described later with reference to FIG. 20) required for transmitting the requested image at the respective resolutions and the traffic (transmittable capacity) of the image transmission system by accessing the storage unit 105, and determines the resolution upon transmission of the image in the following sequence.

Let Cr be the transmittable capacity calculated by the traffic checking unit 102, C1 be the transmission capacity required for transmitting certain hierarchically encoded image information at resolution 1, C2 be the transmission capacity required for transmitting the image information at resolution 2 (information of layers 1 and 2), C3 be the transmission capacity required for transmitting the image information at resolution 3 (information of layers 1, 2, and 3), and C4 be the transmission capacity required for transmitting the image information at resolution 4 (information of layers 1, 2, 3, and 4). In this case, if $Cr \geq C4$, resolution 4 is selected.

On the other hand, if $C4 > Cr \geq C3$, resolution 3 is selected; if $C3 > Cr \geq C2$, resolution 3 is selected. Also, if $C2 > Cr \geq C1$, resolution 2 is selected; if $C2 > Cr \geq C1$, resolution 1 is selected. If C1>Cr, the resolution selecting unit 103 notifies the image transmission system that a sufficient transmission capacity cannot be obtained even at resolution 1.

Note that the operation of the resolution selecting unit 103 is not limited to the above-mentioned one. If the capacity Cr is not enough to transmit an image at resolution i (i =1, 2, . . . ) (Cr<Ci), an image may be transmitted at resolution i within the bounds of the capacity Cr, or the control may wait until a sufficient capacity Cr ($\geq Ci$) is available.

Figures 20, 21:
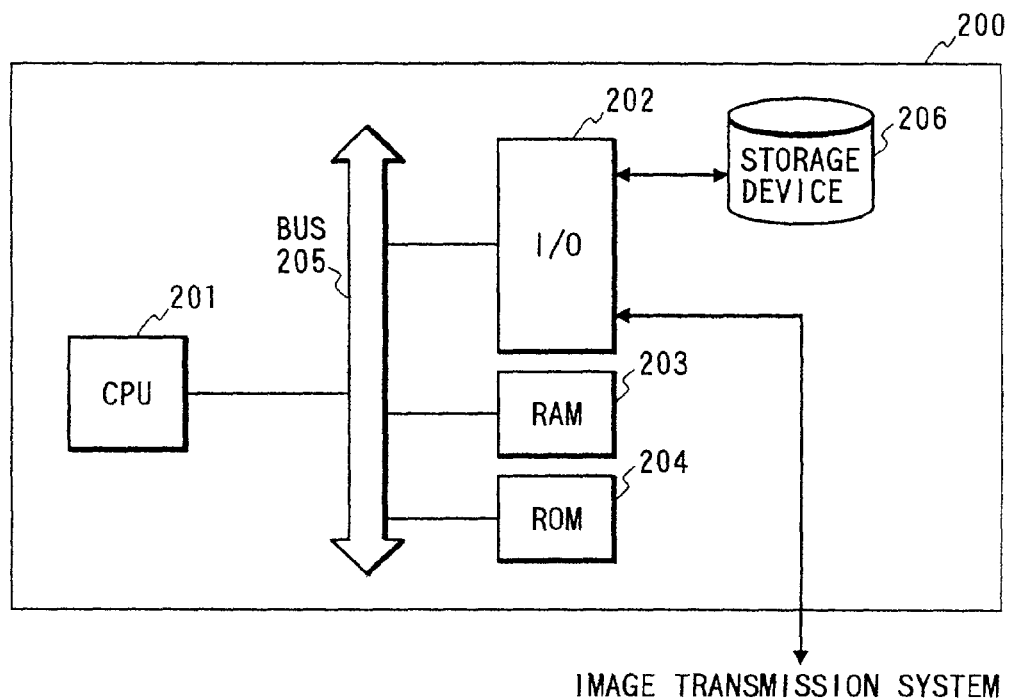
FIG. 20 shows an example of a charge table used by the accounting unit of the first embodiment.
FIG. 21 is a block diagram showing the detailed arrangement of the accounting unit of the first embodiment.

FIG. 20 shows an example of a charge table stored in the storage unit 105. In the charge table shown in FIG. 20, for example, information Info 1 incurs charge 11 and requires transmission capacity C11 when it is provided at resolution 1.

Also, information Info 1 incurs charge 12 and requires transmission capacity C12 when it is provided at resolution 2, and incurs charge 13 and requires transmission capacity C13 when it is provided at resolution 3.

The operation executed when the accounting unit of this embodiment performs accounting processing in a charge system that sets charges in units of resolutions will be described below. In the following description, a case will be exemplified wherein a user (or his or her terminal) requests a provider to transmit image Info 1, and the transmittable capacity of the image transmission system at that time is Cr ($C14 > Cr \geq C13$).

In the first operation step, the control unit 101 fetches information with which the user requests to transmit image Info 1 by monitoring messages transmitted/received in the image transmission system or receiving a message from the image transmission system.

In the second operation step, the traffic checking unit 102 checks the traffic of the image transmission system 110 at that time to obtain a transmittable capacity Cr.

In the third operation step, the control unit 101 notifies the resolution selecting unit 103 of identifier Info 1 of the requested image. The traffic checking unit 102 notifies the resolution selecting unit 103 of the transmittable capacity Cr. Furthermore, the resolution selecting unit 103 reads out transmission capacities required for transmitting image Info 1 at the respective resolutions from the storage unit 105, and compares them with the transmittable capacity Cr so as to select image resolution 3 corresponding to the current traffic. Then, the unit 103 notifies the image transmission system 110 of the selected resolution.

In the fourth operation step, the control unit 101 notifies the accounting processing unit 104 of identifier Info 1 of the requested image. The resolution selecting unit 103 notifies the accounting processing unit 104 of the selected resolution 3.

The accounting processing unit 104 reads out corresponding charge 13 from the charge table stored in the storage unit 105, i.e., that shown in FIG. 3, on the basis of image identifier Info 1 notified from the control unit 101 and resolution 3 notified from the resolution selecting unit 103, and notifies the image transmission system 110 of the readout charge information.

FIG. 21 is a block diagram showing the detailed arrangement of the accounting unit 100 shown in the functional block diagram of FIG. 19.

Referring to FIG. 21, an accounting unit 200 corresponds to the accounting unit 100 shown in FIG. 19. A CPU 201 processes inputs from an I/O interface 202 and generates commands to an external device in accordance with a program stored in a ROM 204 or a RAM 203.

The I/O interface 202 exchanges information with the information transmission system or inputs/outputs data to/from a storage device 206. The RAM 203 is used by the CPU 201 as a temporary memory, and stores a program.

The ROM 204 stores a program to be executed by the CPU 201. When a program is loaded from a device outside the accounting unit 200 or is stored in the RAM 203, the ROM 204 may be omitted.

A bus 205 is used for exchanging data among the components from the CPU 201 to the ROM 204. The storage device 206 stores charges corresponding to different resolutions in units of images, and comprises a magnetic, optical, or semiconductor element.

In FIG. 21, the functions of the control unit 101, the traffic checking unit 102, the resolution selecting unit 103, and the accounting processing unit 104 shown in FIG. 19 can be realized by the CPU 201, the I/O interface 202, the RAM 203, the ROM 204, and the bus 205.

For example, the control of the above-mentioned operation steps, traffic checking processing, resolution selecting processing, accounting processing, and the like are attained by the CPU 201, and the operation sequence, traffic checking method, resolution selecting method, and accounting processing method therefor are stored in the RAM 203 or the ROM 204. The traffic checking processing in the first operation step, resolution notification in the second operation step, and charge notification in the fourth operation step are performed via the I/O interface 202.

Note that the arrangement that realizes the functional blocks shown in FIG. 19 is not limited to that shown in FIG. 21. For example, at least one of the functional blocks shown in FIG. 19 may be constituted by one device, or all the functional blocks shown in FIG. 19 may be constituted as a single device. Also, the operation is not limited to the above-mentioned one, and this embodiment includes the following cases.

More specifically, the second and third operation steps may be combined into one step, and the resolution selecting unit 103 reads out the transmission capacity Ci required for transmitting image Info 1 at a certain resolution i. After the unit 103 notifies the traffic checking unit of the transmission capacity Ci, the traffic checking unit checks if the transmission can be performed at the resolution i.

If the transmission cannot be performed, the resolution selecting unit 103 reads out a transmission capacity required at a resolution (e.g., resolution i-1) lower than the resolution i, and repeats the above-mentioned operation. If the transmission can be performed, the resolution selecting unit 103 notifies the image transmission system and the accounting processing unit 104 of the selected resolution.

Alternatively, in the first operation step, the user designates a resolution upon requesting an image. When the accounting unit of this embodiment in the second to fourth operation steps determines that the image can be transmitted at the designated resolution, the resolution selecting unit 103 notifies the image transmission system of an instruction for transmitting the image at the designated resolution, and the accounting processing unit 104 performs the accounting processing at the designated resolution.

When the transmission cannot be performed, the resolution selecting unit 103 transmits an image at a transmittable rate or waits until the transmission can be performed. Alternatively, the unit 103 notifies the image transmission system of a message indicating that an image is transmitted by lowering the resolution or the request is canceled. The accounting processing unit 104 performs accounting processing corresponding to the respective processing operations.

The second embodiment of the present invention will be described below with reference to the accompanying drawings.

In this embodiment, the present invention is applied to realize an accounting unit used in a charge system that selects the resolution (layer) of an image to be transmitted in correspondence with the traffic of a transmission line, sets unit charges per unit information volume in correspondence with the resolutions in units of images, and determines the charge on the basis of the unit charge and the information volume of the transmitted image, to cope with hierarchical encoding in an image transmission system for transmitting hierarchically encoded image information via the transmission line.

Figure 22:
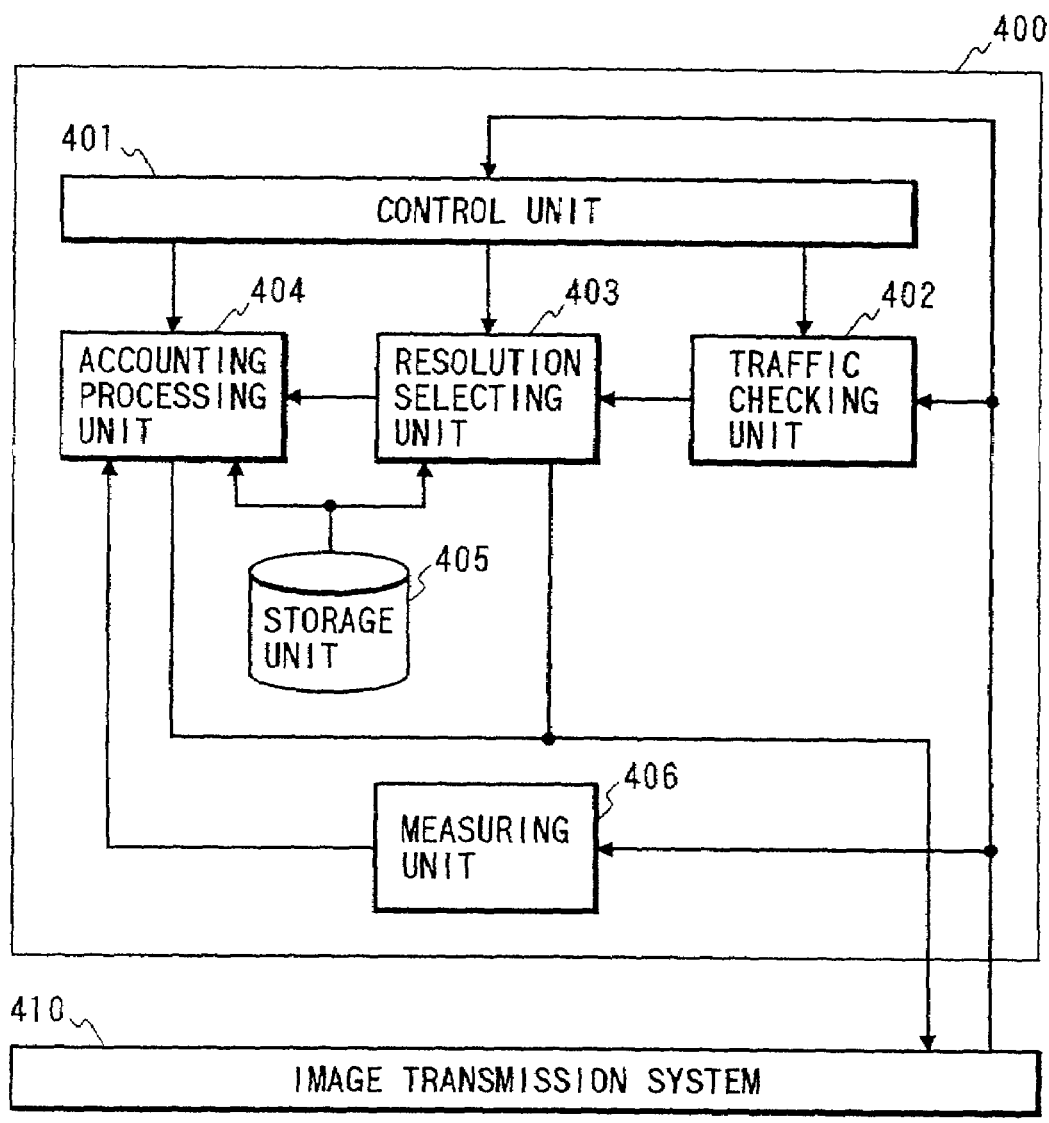
FIG. 22 is a functional block diagram showing an accounting unit according to the second embodiment of the present invention.

FIG. 22 is a functional block diagram showing principal part of an accounting unit according to the image transmission system of the present invention, and corresponds to FIG. 19 in the first embodiment. In the following description, a detailed description of the same arrangement and operation as those in the first embodiment will be omitted.

Referring to FIG. 22, an image transmission system 410 comprises an accounting unit 400, which corresponds to the accounting unit 100 shown in FIG. 19.

A control unit 401 corresponds to the control unit 101 shown in FIG. 19. A traffic checking unit 402 corresponds to the traffic checking unit 102 shown in FIG. 19. A resolution selecting unit 403 corresponds to the resolution selecting unit 103 shown in FIG. 19.

An accounting processing unit 404 corresponds to the accounting processing unit 104 shown in FIG. 19. A storage unit 405 stores charge information of images to be referred to by the control unit 401, and corresponds to the storage unit 105 shown in FIG. 19. The image transmission system 410 corresponds to the image transmission system 110 shown in FIG. 19.

A measuring unit 406 measures the information volume of image information transmitted/received in the image transmission system 410, and is not arranged in the first embodiment described above.

The contents of a charge table stored in the storage unit 402 are the same as those shown in FIG. 20.

The operation when the accounting unit of this embodiment performs accounting processing in a charge system that sets charges per unit information volume in correspondence with resolutions, and determines the charge on the basis of the unit information volume and the information volume of the transmitted image will be described below. In the following description, a case will be exemplified below wherein a user (or his or her terminal) requests a provider to transmit image Info 1, and the transmittable capacity of the image transmission system at that time is Cr (C14>Cr≧C13). In this case, the first to fourth operation steps are the same as those in the first embodiment described above, and a detailed description thereof will be omitted.

In this embodiment, upon completion of the fourth operation step, in the fifth operation step, the measuring unit 406 counts the information volume of image Info 1 while the image transmission system 410 is transmitting image Info 1. Upon completion of transmission of image Info 1, the accounting processing unit 404 determines the charge on the basis of unit charge 12 and the counted information volume, and notifies the image transmission system 410 of the determined charge.

Figure 23:
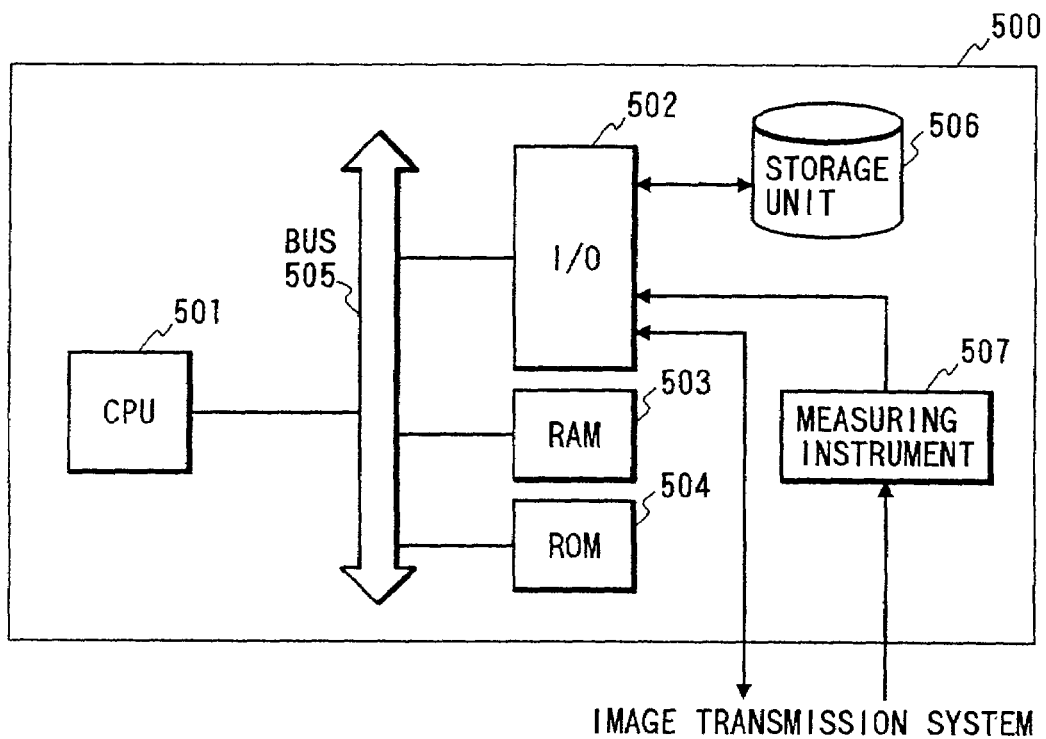
FIG. 23 is a block diagram showing the detailed arrangement of the accounting unit of the second embodiment.

FIG. 23 is a block diagram showing the detailed arrangement of the accounting unit 400 shown in the functional block diagram of FIG. 22.

Referring to FIG. 23, an accounting unit 500 corresponds to the accounting unit 200 shown in FIG. 21. A CPU 501 corresponds to the CPU 201 shown in FIG. 21. An I/O interface 502 corresponds to the I/O interface 202 shown in FIG. 21.

A RAM 503 corresponds to the RAM 203 shown in FIG. 21, and a ROM 504 corresponds to the ROM 204 shown in FIG. 21. A bus 505 is used for exchanging data among the components from the CPU 501 to the ROM 504, and corresponds to the bus 205 shown in FIG. 21.

A storage device 506 stores charges corresponding to different resolutions in units of images, and corresponds to the storage device 206 shown in FIG. 21.

A measuring instrument 507 measures the transmission volume of image information transmitted/received in the image transmission system 410, and comprises, e.g., a counter. In this case, when time is measured in place of the information volume, and the charge is determined on the basis of the unit charge and the measured time, the CPU may perform measurements, and the measuring instrument 507 may be omitted.

Referring to FIG. 23, the functions of the control unit 401, the traffic checking unit 402, the resolution selecting unit 103, and the accounting processing unit 404 shown in FIG. 22 can be realized by the CPU 501, the I/O interface 502, the RAM 503, the ROM 504, the bus 505, and the measuring instrument 507 (the measuring instrument 507 may be omitted when time is measured).

In this embodiment as well, various modifications described in the first embodiment may be made. In this embodiment, the charge at that time may be calculated by the method as in the fifth operation step at an arbitrary timing during image transmission, and the accounting processing unit 404 notifies the image transmission system of the charge.

The third embodiment of the present invention will be described below.

In this embodiment, the present invention is applied to allow settle accounts at predetermined time intervals by calculating the accumulated charge in the first and second embodiments. Note that the arrangement of an accounting unit of this embodiment is the same as that shown in FIG. 22.

Figure 24A:
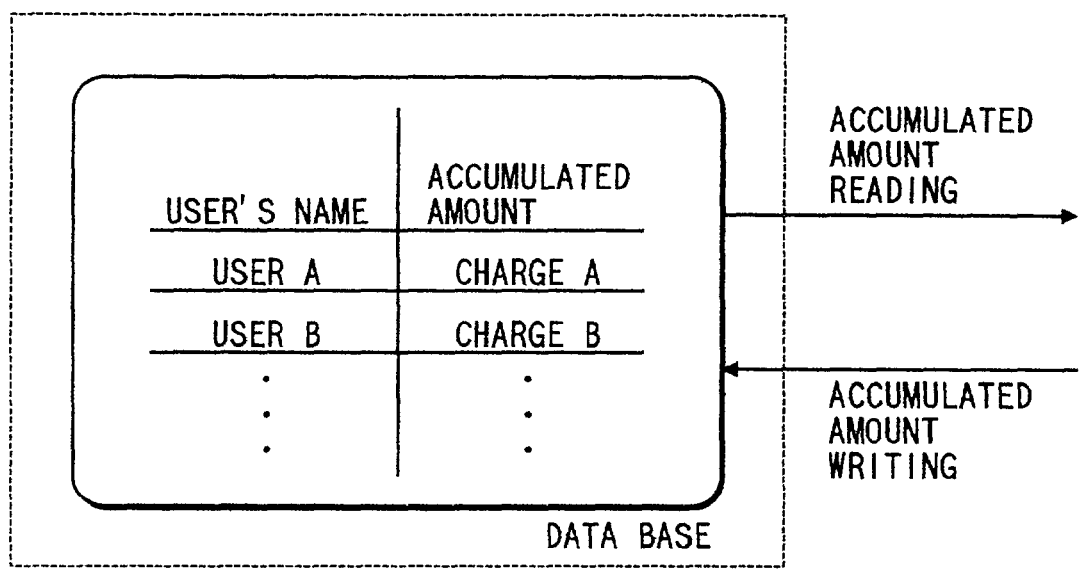
FIGS. 24A and 24B show examples of accumulated charge tables used by an accounting unit according to the third embodiment of the present invention.
Figure 24B:
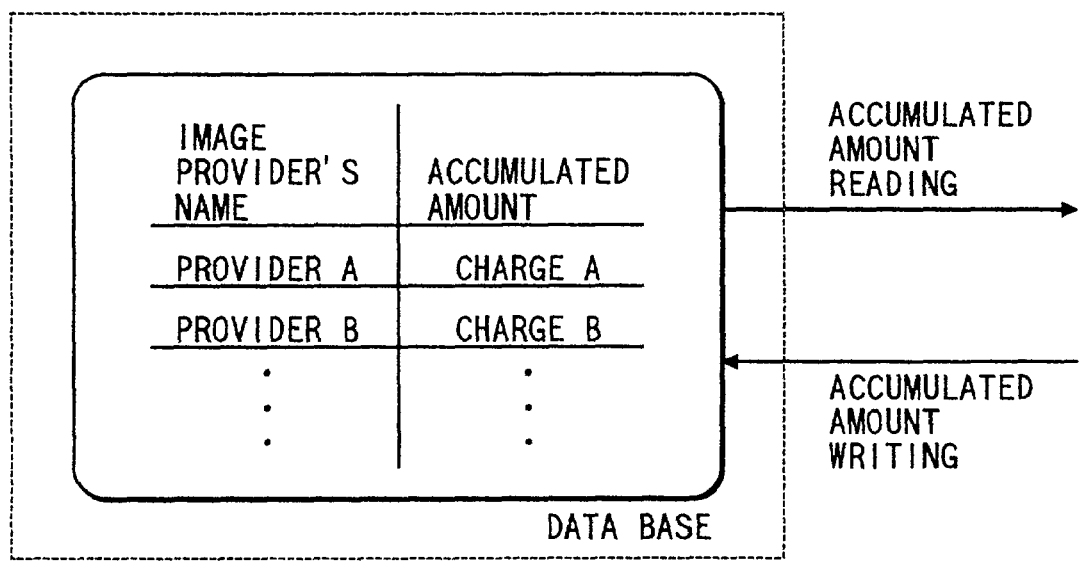

FIGS. 24A and 24B show examples of accumulated amount tables stored in the storage unit of this embodiment. For example, FIG. 24A shows an accumulated amount table when the accounting unit is arranged in a terminal on the image provider side. Referring to FIG. 24A, only Charge A of those of images provided to User A is not paid yet, and only Charge B of those of images provided to User B is not paid yet.

On the other hand, FIG. 24B shows an accumulated amount table when the accounting unit is arranged in a terminal on the user side. Referring to FIG. 24B, only Charge A of those of images provided from provider A is not paid yet, and only Charge B of those of images provided from provider B is not paid yet.

A sequence for calculating the accumulated amount of charges obtained based on the unit charges and information volumes of images by the accounting unit of this embodiment will be described below. In the following description, a case will be exemplified below wherein User L (or his or her terminal) requests provider A to transmit image Info 1, and the transmittable capacity of the image transmission system at that time is Cr (C14>Cr≧C13).

Note that the first to fifth operation steps in the operation sequence of this embodiment is the same as those described above, and a detailed description thereof will be omitted.

In this embodiment, upon completion of the fifth operation step described above, in the sixth operation step, an accounting processing unit reads out the accumulated amount of charges for User L from a storage unit, adds the charge calculated in the fifth operation step to the readout accumulated amount, and records the sum data in the storage unit 705.

The fourth embodiment of the present invention will be described below with reference to the accompanying drawings.

Figure 25:
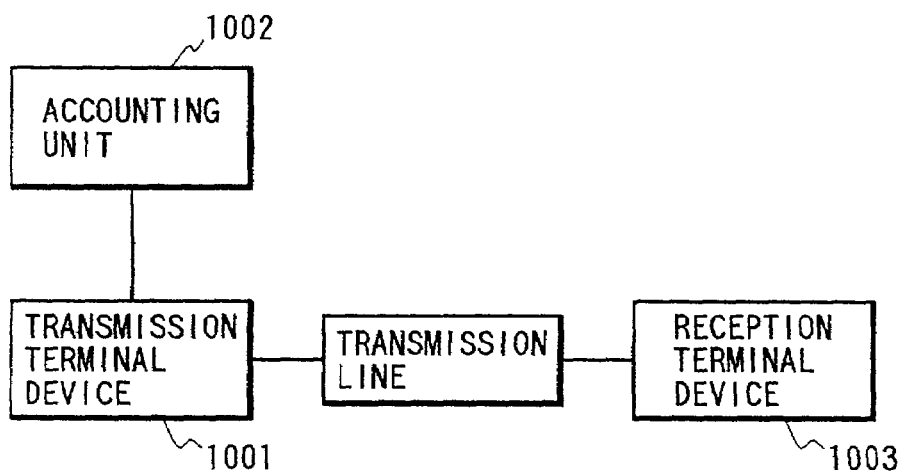
FIG. 25 is a block diagram showing the arrangement of principal part of an image transmission system according to the fourth embodiment of the present invention.

FIG. 25 is a block diagram showing a case wherein an image provider (or his or her terminal device) has one of the accounting processing units described in the first to third embodiments.

Referring to FIG. 25, a transmission terminal device 1001 on the image provider side comprises a computer such as a personal computer, a workstation, or the like, or an image transmitter, which comprises an accounting unit 1002.

The accounting unit 1002 corresponds to one of the accounting processing units described in the first to third embodiments. A reception terminal device 1003 on the user side comprises a computer such as a personal computer, a workstation, or the like, or an image receiver.

The operation of this embodiment will be described below with reference to FIG. 26. In the following description, a case will be exemplified wherein User L (reception terminal device 1003) requests provider A (transmission terminal device 1001) to transmit image Info 1 and the transmittable capacity of the image transmission system at that time is Cr (C14>Cr≧C13) when the accounting processing unit of the second embodiment and an apparatus therefor are used.

In the first operation step, User L transmits a message that requests provider A to transmit image Info 1 to provider A via a transmission line (this message will be referred to as an image transmission request message hereinafter). When the terminal device 1001 of provider A receives the image transmission request message, the accounting unit 1002 fetches the image transmission request message from the transmission terminal device 1001.

In the second operation step, the accounting unit 1002 checks the traffic of the transmission line via the transmission terminal device 1001 to obtain a transmittable capacity Cr, and thereafter, refers to capacities C11 to C14 in a charge table shown in FIG. 20. Then, the unit 1002 compares the transmittable capacity Cr with capacities C11 to C14, and determines that image Info 1 is to be transmitted at resolution 3. The unit 1002 notifies the transmission terminal device 1001 of resolution 3.

In the third operation step, the transmission terminal device 1001 transmits image Info 1 at resolution 3 to User L via the transmission line. At the same time, the accounting unit 1002 measures the information volume of image Info 1 which is being transmitted from the transmission terminal device 1001.

In the fourth operation step, the accounting unit 1002 monitors image Info 1 which is being transmitted. When the unit 1002 recognizes the end of transmission of image Info 1 to User L by detecting a bit pattern indicating the end of the image or by receiving a message indicating the end of transmission of image Info 1 to User L, it reads out unit charge 13 from the above-mentioned charge table, and determines the charge for User L on the basis of the information volume of image Info 1 provided to User L and unit charge 13.

In the fifth operation step, the accounting unit 1002 outputs the charge calculated in the fourth operation step to the transmission terminal device 1001.

In the sixth operation step, the charge is paid.

Note that this embodiment also includes the following cases.

In the first operation step, the user may designate a resolution when he or she requests an image. When a transmission capacity Cr enough to transmit the image at the designated resolution cannot be obtained, the accounting processing unit transmits an image at the designated resolution within the bounds of the transmission capacity Cr. Alternatively, the accounting processing unit waits until a sufficient transmission capacity is assured. Alternatively, the accounting processing unit transmits an image at a resolution that allows transmission with the transmission capacity Cr.

Alternatively, the accounting processing unit supplies an instruction for canceling the request to an image transmission apparatus, and performs accounting processing in accordance with the instruction. In this case, the image transmission apparatus performs image transmission processing or processing for canceling the request together with an image reception apparatus. Note that one of the above-mentioned processing operations may be selected by the user upon inquiry.

In the first operation step, the user may also designate a terminal device (or image processing apparatus) as a destination of an image when he or she requests an image provider to transmit an image, and provider A transmits image information to the designated destination.

In the third operation step, unit charge 13 may be read out, and the charge incurred so far may be calculated on the basis of unit charge 13 and the information volume at that time. The calculated charge may be output to the transmission terminal device 1001, thus notifying provider A or User L of the charge.

In the fourth operation step, after unit charge 13 is read out, unit charge 13 may be output to the transmission terminal device 1001, and the transmission terminal device 1001 may transmit unit charge 13 to User L via the transmission line.

In the fifth operation step, the transmission terminal device 1001 may notify User L of the charge via the transmission line.

The accounting processing unit 1002 may be realized by a CPU, memory, storage device, and the like of the transmission terminal device 1001.

In this embodiment, the following modifications may be taken into consideration in addition to the above-mentioned examples. That is, this embodiment may include modifications in which the accounting processing units of the first and third embodiments are applied.

The fifth embodiment of the present invention will be described below with reference to the accompanying drawings.

Figure 27:
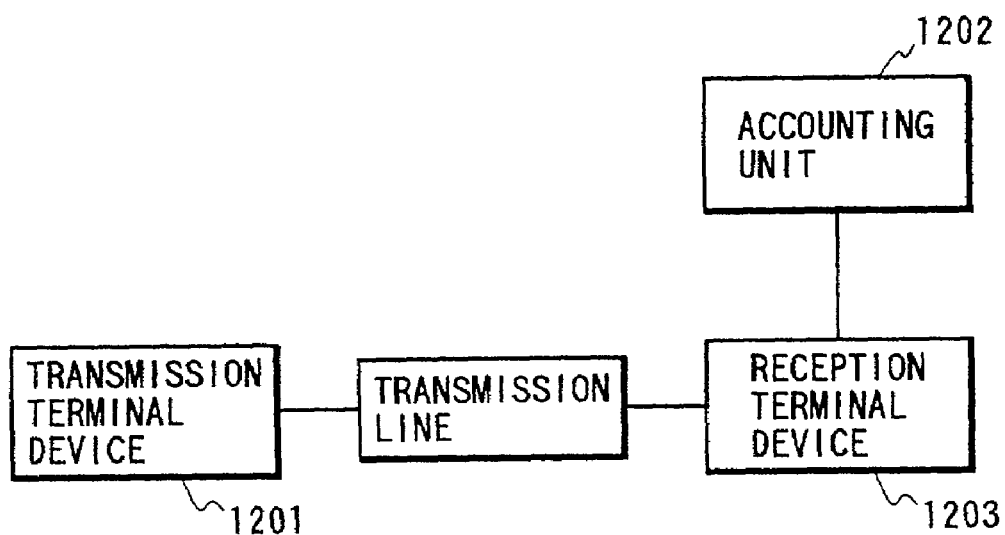
FIG. 27 is a block diagram showing the arrangement of principal part of an image transmission system according to the fifth embodiment of the present invention.

FIG. 27 shows a case wherein a user (or his or her terminal device) has one of the accounting processing units described in the first to third embodiments.

Referring to FIG. 27, a transmission terminal device 1201 on the image provider side comprises a computer such as a personal computer, a workstation, or the like, or an image transmitter, which comprises an accounting unit. An accounting unit 1202 corresponds to one of the accounting processing units described in the first to third embodiments. A reception terminal device 1203 on the receiver side comprises a computer such as a personal computer, a workstation, or the like, or an image receiver.

The operation of this embodiment will be described below with reference to FIG. 28. In the following description, a case will be exemplified wherein User L (reception terminal device 1203) requests provider A (transmission terminal device 1201) to transmit image Info 1 and the transmittable capacity of the image transmission system at that time is Cr (C14>Cr≧C13) when the accounting processing unit of the second embodiment is used.

In the first operation step [S1], User L transmits a message that requests provider A to transmit image Info 1 to provider A via a transmission line (this message will be referred to as an image transmission request message hereinafter). The accounting unit 1202 fetches the image transmission request message from the reception terminal device 1203.

In the second operation step [S2], the accounting unit 1202 checks the traffic of the transmission line via the transmission terminal device 1201 to obtain a transmittable capacity Cr, and thereafter, refers to capacities C11 to C14 in the charge table described above. Then, the unit 1202 compares the transmittable capacity Cr with capacities C11 to C14, and determines that image Info 1 is to be transmitted at resolution 3. The unit 1202 notifies the reception terminal device 1203 of resolution 3.

The reception terminal device 1203 notifies the transmission terminal device 1201 of a message indicating that "User L requests provider A to transmit image Info 1 at resolution 3".

In the third operation step [S3], upon reception of the message from the reception terminal device 1203, the transmission terminal device 1201 transmits image Info 1 at resolution 3 to User L via the transmission line. At the same time, the accounting unit 1202 measures the information volume of image Info 1 which is being received by the reception terminal device 1203.

In the fourth operation step [S4], the accounting unit 1202 monitors image Info 1 which is being received, and recognizes the end of reception of image Info 1 from provider A by detecting a bit pattern indicating the end of the image or by receiving a message indicating the end of reception of image Info 1 from provider A from the reception terminal device 1203.

Upon recognition of the end of reception, as described above, the accounting unit 1202 reads out unit charge 13 from the above-mentioned charge table, determines the charge payable to provider A on the basis of the information volume of image Info 1 received from provider A and unit charge 13, and outputs the determined charge to the reception terminal device 1203.

In the fifth operation step [S5], the charge is paid.

Note that this embodiment also includes the following cases.

In the first operation step, the user may designate a resolution when he or she requests an image.

When a transmission capacity Cr enough to transmit the image at the designated resolution cannot be obtained, the accounting processing unit transmits an image at the designated resolution within the bounds of the transmission capacity Cr. Alternatively, the accounting processing unit waits until a sufficient transmission capacity is assured. Alternatively, the accounting processing unit transmits an image at a resolution that allows transmission with the transmission capacity Cr.

Alternatively, the accounting processing unit supplies an instruction for canceling the request to an image transmission apparatus, and performs accounting processing in accordance with the instruction. In this case, the image transmission apparatus performs image transmission processing or processing for canceling the request together with an image reception apparatus.

Note that one of the above-mentioned processing operations may be selected by the user upon inquiry.

In the first operation step, the user may also designate a terminal device (or image processing apparatus) as a destination of an image when he or she requests an image provider to transmit an image, and provider A transmits image information to the designated destination. This case further includes the following two cases.

In the first case, the user has an accounting processing unit. In this case, the user (or his or her accounting processing unit) is notified of the start of transmission of an image from the destination or the image provider before the third operation step, and starts an accounting operation.

Upon completion of image provision, in the fourth operation step, the user is notified of the end of transmission of the image, and ends the accounting operation. As for the information volume, the user is notified from the destination or the provider.

In the second case, the destination designated by the user has an accounting processing unit. In this case, the user also transmits an image transmission request message to the destination in the first operation step, and the accounting processing unit of the destination fetches the image transmission request message. The accounting processing unit of the destination notifies the provider or user of the calculated charge in the fourth operation step.

In the first operation step, the reception terminal device 1203 may transmit an image transmission request message, and the transmission terminal device 1201 may select resolution 3 by the same method as in the accounting unit 1202.

In the third operation step, unit charge 13 may be read out in advance, the charge incurred so far may be calculated on the basis of unit charge 13 and the information volume of image Info 1 that has been received at that time, and the calculated charge may be output to the reception terminal device 1203. The device 1203 may display the received charge to notify User L of it.

Note that the following modifications may be taken into consideration. More specifically, this embodiment may include modifications: the accounting unit 1202 may be realized by a CPU, memory, storage device, and the like of the reception terminal device 1203; and the accounting processing unit of the first or second embodiment may be used.

The sixth embodiment of the present invention will be described below with reference to the accompanying drawings.

Figure 29:
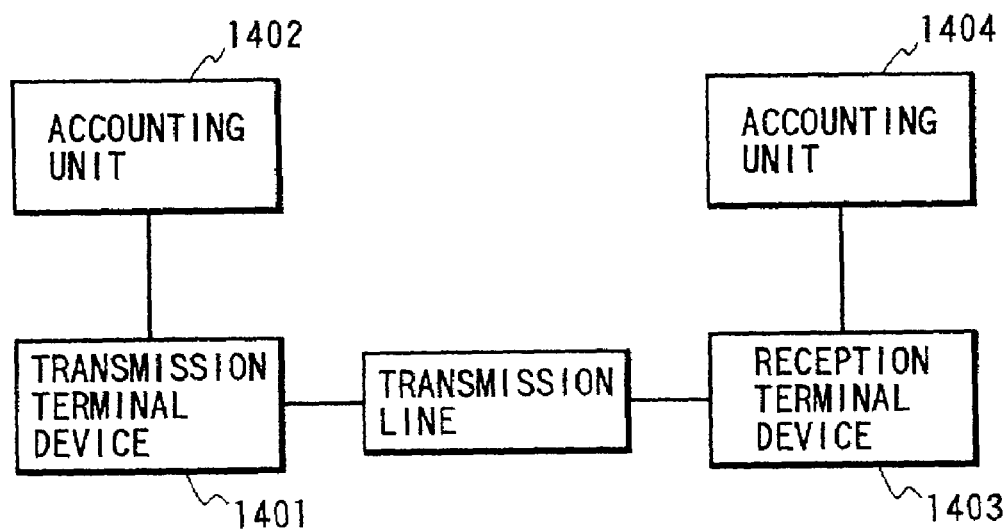
FIG. 29 is a block diagram showing the arrangement of principal part of an image transmission system according to the sixth embodiment of the present invention.

FIG. 29 shows a case wherein both an image provider (or his or her terminal device) and a user (or his or her terminal device) have corresponding ones of the accounting processing units described in the first to third embodiments.

Referring to FIG. 29, a transmission terminal device 1401 on the image provider side comprises a computer such as a personal computer, a workstation, or the like, or an image transmitter, which comprises an accounting unit 1402. The accounting unit 1402 corresponds to one of the accounting processing units described in the first to third embodiments. A reception terminal device 1403 on the user side comprises a computer such as a personal computer, a workstation, or the like, or an image receiver, which comprises an accounting unit 1404. The accounting unit 1404 corresponds to one of the accounting processing units described in the first to third embodiments.

The operation of this embodiment will be described below with reference to FIG. 30. In the following description, a case will be exemplified wherein User L (reception terminal device 1403) requests provider A (transmission terminal device 1401) to transmit image Info 1 and the transmittable capacity of the image transmission system at that time is Cr (C14>Cr≧C13) when the accounting processing unit of the second embodiment and an apparatus therefor are used.

In the first operation step [S1], User L (reception terminal device 1403) transmits a message that requests provider A (transmission terminal device 1401) to transmit image Info 1 to provider A via a transmission line (this message will be referred to as an image transmission request message hereinafter). The accounting unit 1404 fetches the image transmission request message from the reception terminal device 1403. When the transmission terminal device 1401 receives the image transmission request message, the accounting unit 1402 fetches the image transmission request message from the transmission terminal device 1401.

In the second operation step [S2], the accounting unit 1402 checks the traffic of the transmission line via the transmission terminal device 1401 to obtain a transmittable capacity Cr, and thereafter, refers to capacities C11 to C14 in the charge table described above. Then, the unit 1402 compares the transmittable capacity Cr with capacities C11 to C14, and determines that image Info 1 is to be transmitted at resolution 3. The unit 1402 notifies the transmission terminal device 1401 of resolution 3.

The accounting unit 1404 similarly obtains resolution 3, and notifies the reception terminal device 1403 of it.

In the third operation step [S3], the transmission terminal device 1401 transmits image Info 1 at resolution 3 to the reception terminal device 1403 via the transmission line. The accounting unit 1402 measures the information volume of image Info 1 which is being transmitted by the transmission terminal device 1401.

The reception terminal device 1403 receives image Info 1 sent via the transmission line. On the other hand, the accounting unit 1404 measures the information volume of image Info 1 which is being received by the reception terminal device 1403.

In the fourth operation step [S4], the accounting unit 1402 monitors image Info 1 which is being transmitted. When the unit 1402 recognizes the end of transmission of image Info 1 to User L by detecting a bit pattern indicating the end of the image or by receiving a message indicating the end of transmission of image Info 1 to User L, it reads out unit charge 13 from the above-mentioned charge table. Then, the unit 1402 calculates the charge for User L on the basis of the information volume of image Info 1 provided to User L and unit charge 13, and notifies the transmission terminal device 1401 of the charge.

The accounting unit 1404 monitors image Info 1 which is being received. When the unit 1404 recognizes the end of reception of image Info 1 from provider A by detecting a bit pattern indicating the end of the image or by receiving a message indicating the end of reception of image Info 1 from provider A from the reception terminal device 1403, it reads out unit charge 13 from the above-mentioned charge table.

The unit 1404 calculates the charge payable to provider A on the basis of the information volume of image Info 1 received from provider A and unit charge 13, and notifies the reception terminal device 1403 of the charge.

In the fifth operation step [S5], the charge is paid.

Note that this embodiment also includes the following cases.

In the first operation step [S1], the user may designate a resolution when he or she requests an image.

When a transmission capacity Cr enough to transmit the image at the designated resolution cannot be obtained, the accounting unit 1402 (or 1404) transmits an image at the designated resolution within the limits of the transmission capacity Cr. Alternatively, the accounting unit waits until a sufficient transmission capacity is assured. Alternatively, the accounting unit transmits an image at a resolution that allows transmission with the transmission capacity Cr.

Alternatively, the accounting unit supplies an instruction for canceling the request to an image transmission apparatus (or an image reception apparatus in the case of the accounting unit 1404), and performs accounting processing in accordance with the instruction. In this case, the image transmission apparatus performs image transmission processing or processing for canceling the request together with an image reception apparatus. Note that one of the above-mentioned processing operations may be selected by the user upon inquiry.

In the first operation step [S1], the user may also designate a terminal device (or image processing apparatus) as a destination of an image when he or she requests an image provider to transmit an image, and provider A transmits image information to the designated destination. This case further includes the following two cases.

More specifically, in the first case, the provider and the user have accounting units. In this case, the user (or his or her accounting processing unit) is notified of the start of transmission of an image from the destination or the image provider before the third operation step [S3], and starts an accounting operation. Upon completion of image provision, in the fourth operation step [S4], the user is notified of the end of transmission of the image, and ends the accounting operation. As for the information volume, the user is notified from the destination or the provider.

In the second case, the provider and the destination designated by the user have accounting units. In this case, the user also transmits an image transmission request message to the destination in the first operation step [S1], and the accounting unit of the destination fetches the image transmission request message. The accounting unit of the destination may notify the user of the calculated charge in the fourth operation step [S4].

In the second operation step [S2], the accounting unit 1402 may read out unit charge 13, and notify the transmission terminal device 1401 of it. The transmission terminal device 1401 may display the received unit charge, thus notifying provider A of it.

Furthermore, in the second operation step [S2], the accounting unit 1404 may read out unit charge 13, and notify the reception terminal device 1403 of it. The reception terminal device 1403 may display the received unit charge, thus notifying User L of it.

In the third operation step [S3], the accounting unit 1404 may read out unit charge 13 in advance, calculate the charge incurred so far on the basis of unit charge 13 and the information volume of image Info 1 that has been received at that time, and output the calculated charge to the reception terminal device 1403.

The accounting unit 1402 may be realized by a CPU, memory, storage device, and the like of the transmission terminal device 1401.

The accounting unit 1404 may be realized by a CPU, memory, storage device, and the like of the reception terminal device 1404.

Furthermore, the accounting processing unit of the first or third embodiment may be used.

All the networks using the above-mentioned accounting unit are embodiments according to the present invention. Especially, a preferred embodiment of a network using the accounting unit of this embodiment will be explained below.

As described above, according to the system of each of the above embodiments, since the resolution of an image to be transmitted is selected in accordance with the traffic of the transmission line, and the accounting processing is performed in correspondence with the selected resolution, an accounting system that can fully utilize the features such as the types and qualities of information and services can be realized. With this system, various kinds of information and services can be copied with.

According to the above embodiments, accounting processing can be performed in correspondence with the hierarchical encoding technique.

According to the above embodiments, since accounting processing can be performed in consideration of the information volume of an image as well as the resolution of an image to be transmitted, an optimal accounting operation corresponding to the practical state of image transmission can be attained.

On the other hand, since accounts for images subjected to accounting processing can be simultaneously settled at predetermined time intervals, payment of image charges can be prevented from being delayed.

Also, information can be protected from being tapped or forged, and fair accounting processing can be performed.

Furthermore, an image can be hierarchically encoded in a designated layer, and accounting processing can be performed in correspondence with the designated layer.

Embodiments that set the charge system in correspondence with the image quality involved will be explained below.

Figure 31:
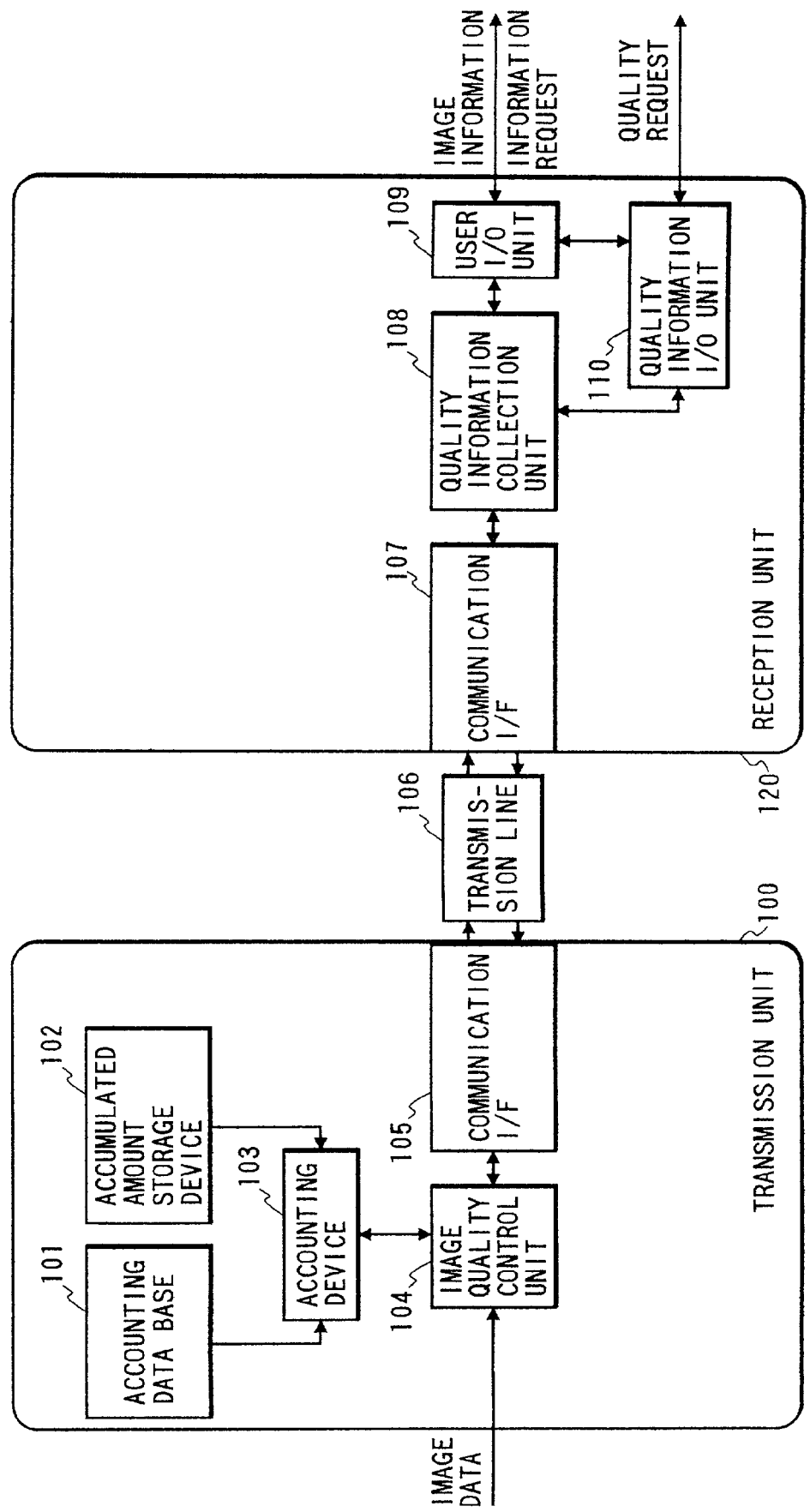
FIG. 31 is a block diagram showing the first embodiment of the present invention.

FIG. 31 is a block diagram showing an embodiment of the present invention.

Referring to FIG. 31, a transmission unit 100 transmits image information. A reception unit 120 is used by a user. A transmission line 106 is used for communications between the transmission unit 100 and the reception unit 120.

The transmission unit 100 includes a charge data base 101, an accumulated amount storage device 102, an accounting device 103, an image quality control unit 104, and a communication interface 105. The reception unit 120 includes an interface 107, a quality information collection unit 108, a user I/O unit 109, and a quality information I/O unit 110.

FIG. 32 shows the contents of the charge data base 101. The charge data base stores the information to be provided to the user, and the charge per unit volume of the information in correspondence with each other. The charge per unit volume, which differs for each information, will be referred to as a unit charge hereinafter. To allow user's selection, each information is assigned a title. Such charge data base 101 can be easily constituted by the existing data base. In this case, the number of pixels of an image, the chromaticity level, saturation level, and lightness level of each pixel, the number of frames per unit time, and the like are converted into information volumes, and unit charges are registered in the charge data base 101. The charge data base 101 can be constituted by a semiconductor storage device, a magnetic storage device, an optical storage device, or the like.

FIG. 33 shows the contents of the accumulated amount storage device 102. The storage device 102 can be constituted by a semiconductor storage device, a magnetic storage device, an optical storage device, or the like. The accumulated amount storage device 102 stores the accumulated amounts of charges incurred during a predetermined period in units of users. When accounts are settled upon each information transmission, the accumulated amount storage device 102 may be omitted.

Figure 34:
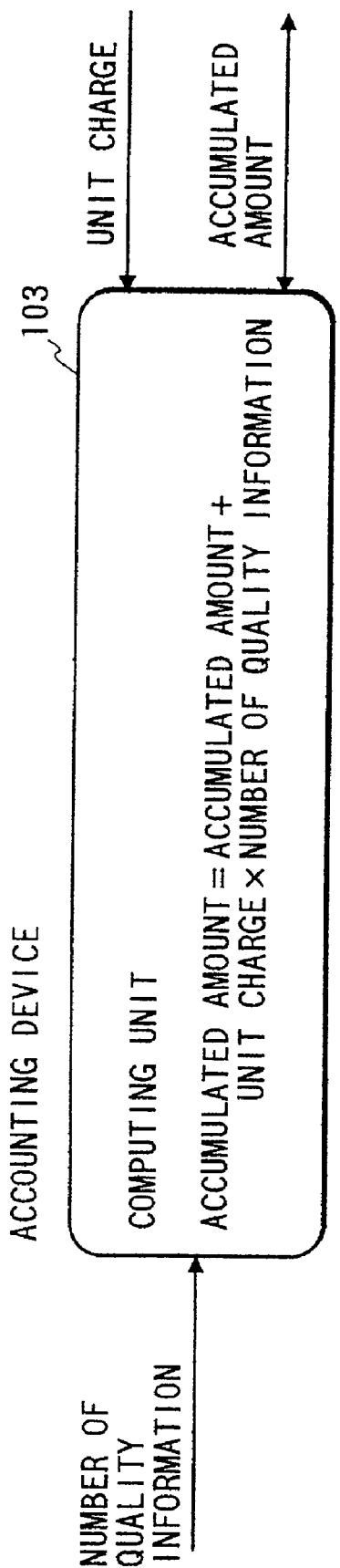
FIG. 34 is a diagram showing the arrangement of the accounting device shown in FIG. 31.

FIG. 34 shows the arrangement of the accounting device 103. The accounting device 103 can be constituted by a CPU, multiplier, adder, and the like.

The operation will be described below.

For example, user A shown in FIG. 33 issues an information request using the user I/O unit 109 of the reception unit 120, and at the same time, selects and sets the quality of a specific image using the quality information I/O unit 110. More specifically, user A sets the number of frames per unit time, the number of pixels, the chromaticity level, the saturation level, and the lightness level of an image, and the like. The information request and quality information are output via the communication interface 107 and the transmission line 106, and are input to the image quality control unit 104 via the communication interface 105. The image quality control unit 104 attains calculations for thinning out pixels of the encoded input image data, decreasing or interpolating its chromaticity, saturation, and lightness levels, and so on in accordance with the quality information by digital signal processing using a DSP, selector switches, and the like. The quality information is also input to the accounting device 103.

The accounting device 103 reads out the unit charge and the accumulated amount respectively from the accounting data base 104 and the accumulated amount storage device 102, calculates a new accumulated amount based on an equation shown in FIG. 34 using a calculator, and stores the calculated amount in the accumulated amount storage device 102. On the other hand, the image information, which has been subjected to the above-mentioned image processing in the image quality control unit 104 to have an appropriately adjusted quality, is output via the communication interface 105 and the transmission line 106, and is supplied to the quality information correction unit 107 via the communication interface 107. The unit 107 measures the quality of the input image information by calculating the number of frames per unit time, the number of pixels, and the chromaticity, saturation, and lightness levels. After the measured quality is compared with that requested by user A, the image information is delivered to user A via the user I/O unit 109. Note that the reception unit 120 need not perform image quality comparison. In this case, the quality information collection unit 108 and the quality information I/O unit 110 can be omitted.

Note that the image quality in this invention is determined by the number of frames per unit time of an image, the number of pixels, and the dynamic ranges and levels of saturation, lightness, and chromaticity, and the image quality becomes higher as respective items have broader dynamic ranges and a larger number of levels.

Figure 35:
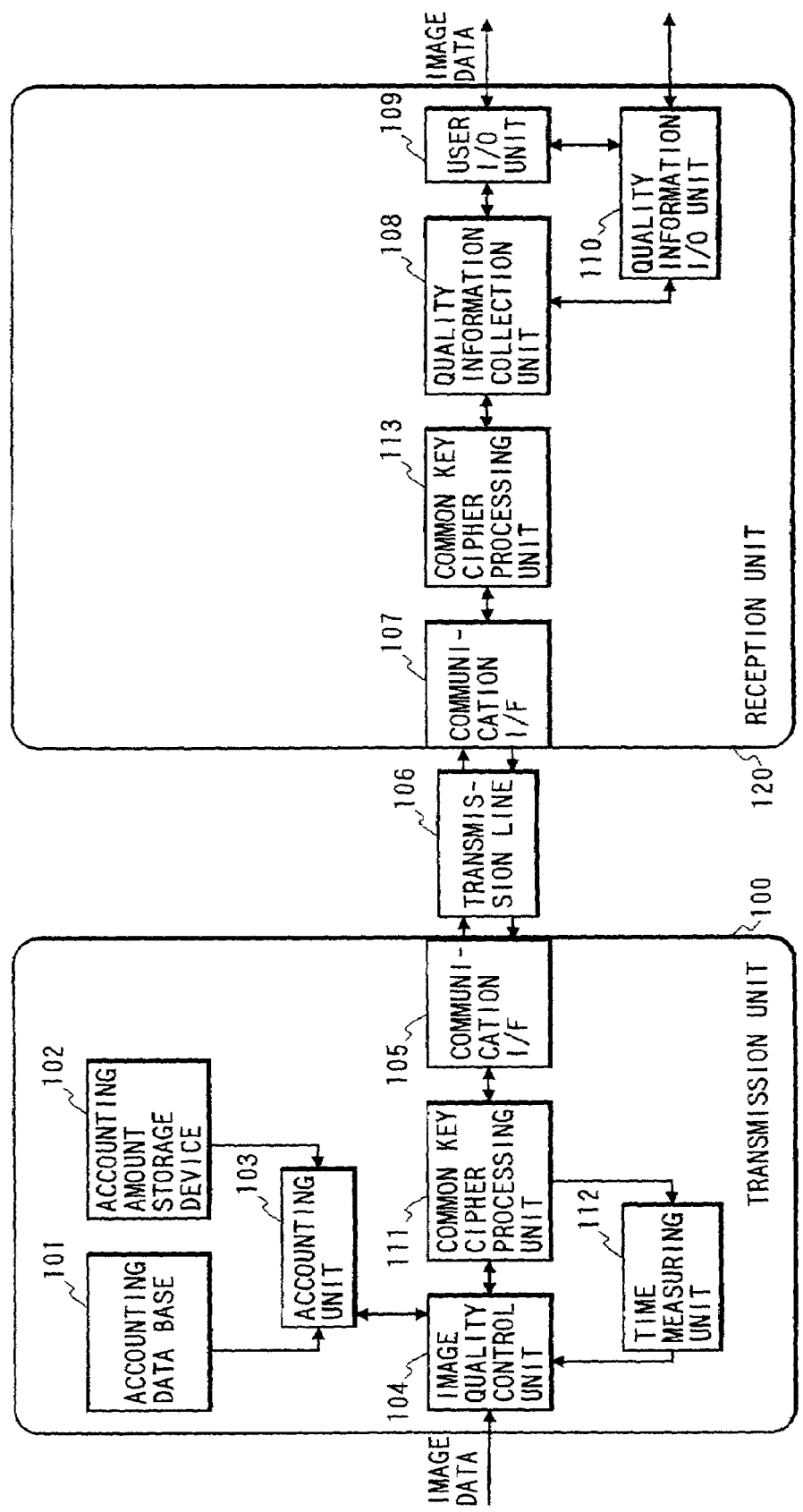
FIG. 35 is a block diagram showing the second embodiment of the present invention.
Figure 14:
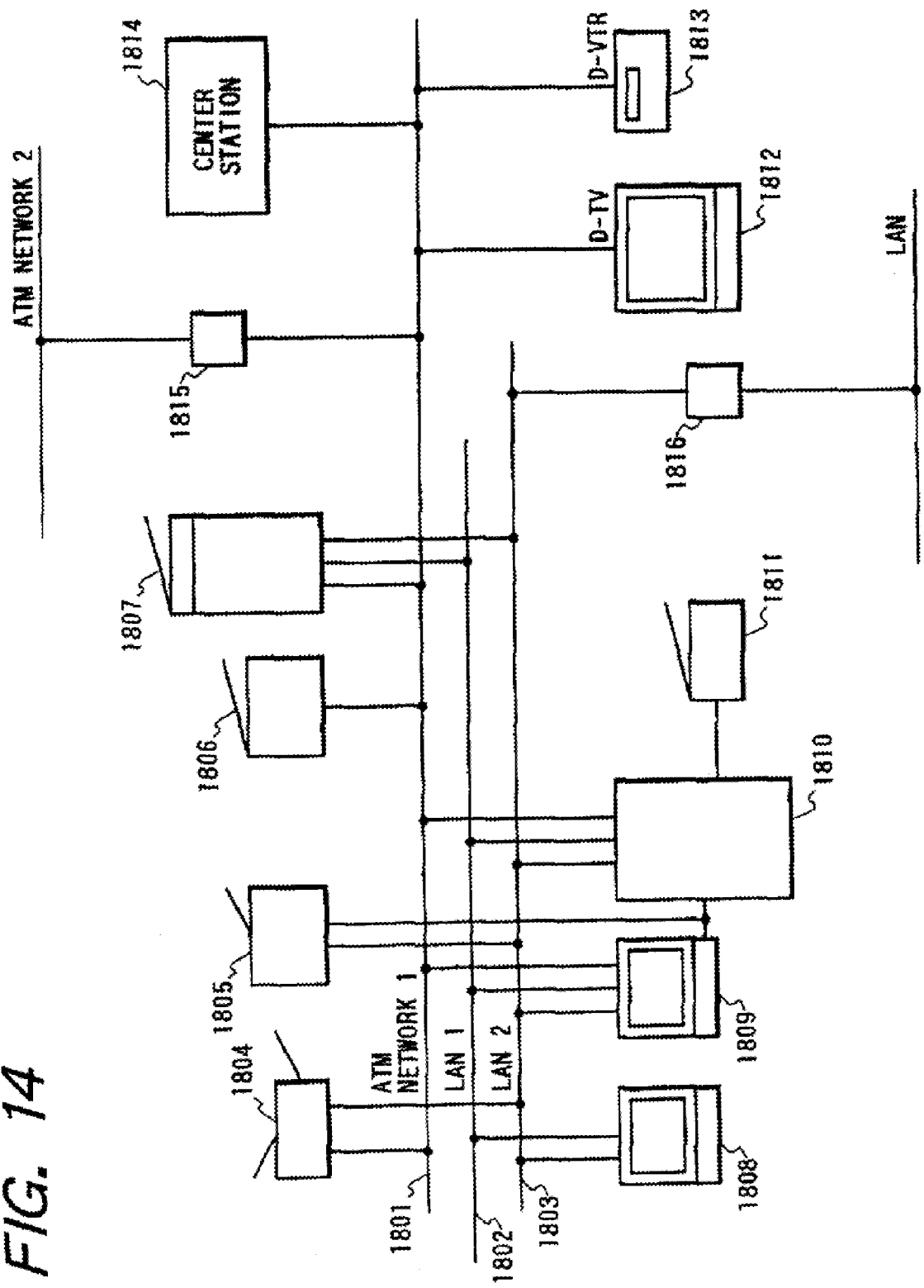

FIG. 35 is a block diagram showing another embodiment of the present invention. The same reference numerals in FIG. 35 denote the same parts as in FIG. 31, and a detailed description thereof will be omitted.

In this embodiment, as shown in FIG. 35, the transmission unit 100 comprises a common key cipher processing unit 111 and a time measuring unit 112, and the reception unit 120 comprises a common key cipher processing unit 113.

The operation will be described below.

Assume that a common key used in the common key cipher processing units 111 and 113 is distributed in advance by a known key distribution method, e.g., a key distribution method based on ID (Shigeo Tsujii & Masao Kasahara, "Cipher and Security", Shokodo (1990), a public key cipher system (Shinichi Ikeno & Kenji Koyama, "Theory of Modern Cipher", *The institute of Electronics, Information and Communication Engineers* (1986)), or a key management data base. Note that a cipher system will be described later.

As in the above embodiment, the user I/O unit 109 and the quality information I/O unit 110 of the reception unit 120 issue an information request and a quality request of an image to be transmitted of a user, and the quality information collection unit 108 stores the requested quality. Thereafter, these requests are enciphered by the common key cipher processing unit 113. The enciphered information is output via the communication interface 107 and the transmission line 106, and is then deciphered by the common key cipher processing unit 111 via the communication interface 105 of the transmission unit 100. The deciphered information request and quality request are supplied to the image quality control unit 104. At the same time, the accounting device 103 performs accounting processing as in the above embodiment.

Input image data is processed by the image quality control unit 104 as in the above embodiment, and is enciphered by the common key cipher processing unit 111. The enciphered image information is deciphered by the common key cipher processing unit 113 via the communication interface 105, the transmission line 106, and the communication interface 107. The deciphered image information is delivered to the user as in the above embodiment.

The time measuring unit 112 measures the operation time of the common key cipher processing unit 111, and supplies the measured time to the accounting unit 103 via the image quality control unit 104, thus performing accounting processing for the enciphered information. In this case, the unit charge per unit time for the enciphered information is set in the accounting data base 102, and the encipher processing time measured by the time measuring unit 112 is set as the number of pieces of quality information in the accounting device 103. Also, the decipher processing time may be measured, and the accounting processing may be performed in correspondence with the measured time.

The protocols on the receiving and transmitting sides will be explained below with reference to FIG. 36.

In FIG. 36, the receiving side issues a transmission request to the transmitting side via an accounting device, as indicated by an arrow 1101, and requests an image quality at the same time. The transmitting side transfers data, as indicated by an arrow 1102, and the receiving side receives the data. At this time, as described in the above embodiments, an accounting operation is executed. The receiving side sends a transmission termination request when it wants to terminate reception of data, as indicated by an arrow 1103. The accounting device on the transmitting side terminates the accounting operation in accordance with this termination request. Then, the transmitting side terminates transmission in accordance with a transmission termination request 1104. The accounting device on the transmitting side notifies the receiving side of the charge, as indicated by an arrow 1105. When data are transferred bidirectionally, similar accounting processing is performed as the transmitting and receiving sides replace each other. As for transmission/reception between other users and information providers, similar operations and accounting processing are performed.

As described above, accounting processing can be performed in various networks.

As described above, according to the above embodiments, appropriate accounting processing can be performed in correspondence with the quality of an image provided to a user.

Since the user can select his or her desired image quality, a fair, appropriate accounting system can be realized.

Since information is enciphered, the security of accounting information can be protected, and the accounting information can be protected from breaches of security such as forging or disguising.

Furthermore, when the cipher processing time is measured, appropriate accounting processing can be performed in correspondence with the reception time of information.

Many widely different embodiments of the present invention may be constructed without departing from the spirit and scope of the present invention. It should be understood that the present invention is not limited to the specific embodiments described in the specification, except as defined in the appended

What is claimed is:

1. An image transmission apparatus for transmitting an image via a transmission path, comprising:
   a reception unit adapted to receive a request for the image;
   a detection unit adapted to detect a transmittable rate of the transmission path, upon receiving the request by the reception unit;
   a selection unit adapted to select a resolution corresponding to the transmittable rate detected by the detection unit;
   a transmission unit adapted to transmit the image, having the resolution selected by the selection unit, in the transmittable rate detected by the detection unit; and
   a charge unit adapted to charge a user for transmission of the image having the resolution selected by the selection unit based on the transmittable rate detected by the detection unit.

2. An apparatus according to claim 1, wherein the request received by the reception unit includes designation of a resolution, and if the transmittable rate detected by the detection unit is larger than a transmittable rate corresponding to the designated resolution, the selection unit executes the selection process.

3. An apparatus according to claim 1, wherein the request received by the reception unit includes designation of a resolution, and the apparatus further comprises a notification unit adapted to notify that the transmittable rate detected by the detection unit is lower than a transmittable rate corresponding to the designated resolution.

4. A computer-readable medium encoded with a computer-readable program for implementing an image transmission method for transmitting an image via a transmission path and executed by a processor, said program comprising:
   code for a reception step of receiving a request for the image;
   code for a detection step of detecting a transmittable rate of the transmission path, upon receiving the request in the reception step;
   code for a selection step of selecting a resolution corresponding to the transmittable rate detected in the detection step;
   code for a transmission step of transmitting the image, having the resolution selected in the selection step, in the transmittable rate detected in the detection step; and
   code for a charge step of charging a user for transmission of the image having the resolution selected in the selection step based on the transmittable rate detected by the detection step.

5. A method for transmitting an image via a transmission path, comprising:
   a reception step of receiving a request for the image;
   a detection step of detecting a transmittable rate of the transmission path, upon receiving the request in the reception step;
   a selection step of selecting a resolution corresponding to the transmittable rate detected in the detection step;
   a transmission step of transmitting the image, having the resolution selected in the selection step, in the transmittable rate detected in the detection step; and
   a charge step of charging a user for transmission of the image having the resolution selected in the selection step based on the transmittable rate detected by the detection step.

* * * * *

UNITED STATES PATENT AND TRADEMARK OFFICE
CERTIFICATE OF CORRECTION

| | |
|---|---|
| PATENT NO. | : 7,155,736 B2 |
| APPLICATION NO. | : 09/874285 |
| DATED | : December 26, 2006 |
| INVENTOR(S) | : Nagashima et al. |

It is certified that error appears in the above-identified patent and that said Letters Patent is hereby corrected as shown below:

IN THE DRAWINGS:

SHEET 9:
FIG. 14, in block 1814, "SENTER" should read -- CENTER --. As shown in attached SHEET 23:
FIG. 33, "ACCUMULATER AMOUNT" should read -- ACCUMULATED AMOUNT --. As shown in attached COLUMN 8:
Line 28, "to" should read -- and --.

COLUMN 11:
Line 65, "multiplier 112" should read -- multiplier 1112 --.

COLUMN 13:
Line 46, "embodiment." should read -- embodiments. --.

COLUMN 17:
Line 47, "machine 1807," should read -- machine 1806, --.

COLUMN 18:
Line 22, "sides" should read -- sides with --.

COLUMN 20:
Line 10, "embodiment" should read -- embodiments --.

COLUMN 21:
Line 14, "with" should be deleted.

COLUMN 23:
Line 48, "resolution 3" should read -- resolution 2 --;
Line 49, "resolution 2" should read --resolution 1 --; and
Line 49, Delete "selected; if $C2 > Cr \geq C1$, resolution 1 is".

COLUMN 27:
Line 21, "allow" should be deleted.

UNITED STATES PATENT AND TRADEMARK OFFICE
CERTIFICATE OF CORRECTION

PATENT NO.        : 7,155,736 B2
APPLICATION NO.   : 09/874285
DATED             : December 26, 2006
INVENTOR(S)       : Nagashima et al.

It is certified that error appears in the above-identified patent and that said Letters Patent is hereby corrected as shown below:

COLUMN 33:
Line 61, "with" should be deleted.

COLUMN 36:
Line 66, "appended" should read -- appended claims. --.

Signed and Sealed this

Twenty Second Day of April, 2008

JON W. DUDAS
*Director of the United States Patent and Trademark Office*

FIG. 32

ACCOUNTING DATA BASE — 101

| KIND OF INFORMATION | UNIT CHARGE |
|---|---|
| NUMBER OF PIXELS 1 | UNIT CHARGE 1 |
| NUMBER OF PIXELS 2 | UNIT CHARGE 2 |
| NUMBER OF PIXELS 3 | UNIT CHARGE 3 |
| ⋮ | ⋮ |
| CHROMATICITY 1 | |
| CHROMATICITY 2 | |
| CHROMATICITY 3 | |
| ⋮ | |
| SATURATION 1 | |
| SATURATION 2 | |

READING OF UNIT CHARGE ⟷

FIG. 33

ACCUMULATED AMOUNT STORAGE DEVICE — 102

| USER'S NAME | ACCUMULATED AMOUNT |
|---|---|
| A | AMOUNT 1 |
| B | AMOUNT 2 |
| C | AMOUNT 3 |
| ⋮ | ⋮ |

READING AND WRITING OF ACCUMULATED AMOUNT ⟷